US012756703B2

(12) United States Patent
Anello et al.

(10) Patent No.: US 12,756,703 B2
(45) Date of Patent: Oct. 6, 2026

(54) ANONYMOUS GUEST DEVICE TOKEN

(71) Applicant: Sonos, Inc., Goleta, CA (US)

(72) Inventors: Dominic Anello, Boston, MA (US); Benjamin Greenberg, Rydal, PA (US)

(73) Assignee: SONOS, INC., Goleta, CA (US)

( * ) Notice: Subject to any disclaimer, the term of this patent is extended or adjusted under 35 U.S.C. 154(b) by 0 days.

(21) Appl. No.: 19/038,239

(22) Filed: Jan. 27, 2025

(65) Prior Publication Data

US 2025/0247387 A1 Jul. 31, 2025

Related U.S. Application Data

(60) Provisional application No. 63/626,339, filed on Jan. 29, 2024.

(51) Int. Cl.
*H04L 9/40* (2022.01)
*H04W 84/12* (2009.01)

(52) U.S. Cl.
CPC ......... *H04L 63/0846* (2013.01); *H04W 84/12* (2013.01)

(58) Field of Classification Search
CPC ........................... H04L 63/0846; H04W 84/12
See application file for complete search history.

(56) References Cited

U.S. PATENT DOCUMENTS

| | | | |
|---|---|---|---|
| 5,440,644 | A | 8/1995 | Farinelli et al. |
| 5,761,320 | A | 6/1998 | Farinelli et al. |
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |

(Continued)

FOREIGN PATENT DOCUMENTS

| | | | |
|---|---|---|---|
| EP | 1389853 | A1 | 2/2004 |
| WO | 0153994 | A2 | 7/2001 |
| WO | 03093950 | A2 | 11/2003 |

OTHER PUBLICATIONS

AudioTron Quick Start Guide, Version 1.0, Mar. 2001, 24 pages.

(Continued)

*Primary Examiner* — Viet D Vu
(74) *Attorney, Agent, or Firm* — Workman Nydegger

(57) ABSTRACT

A guest control device communicates, to a first playback device, a self-signed authorization assertion. The guest control device then receives a signed local-access token. The signed local-access token is signed by the first playback device and allows the guest control device to access services provided by playback devices on the local area network. The guest control device communicates to a cloud network a cloud authorization grant assertion. The cloud authorization grant assertion comprises at least a portion of the signed local-access token. The at least the portion of the signed local-access token comprises an identifier for the first playback device. The guest control device then receives a cloud guest token. The cloud guest token is signed by the cloud network and allows the guest control device to access services on the local area network that are provided by the cloud network.

20 Claims, 23 Drawing Sheets

(56) References Cited

U.S. PATENT DOCUMENTS

| | | | | |
|---|---|---|---|---|
| 6,631,410 | B1 | 10/2003 | Kowalski et al. | |
| 6,757,517 | B2 | 6/2004 | Chang | |
| 6,778,869 | B2 | 8/2004 | Champion | |
| 7,130,608 | B2 | 10/2006 | Hollström et al. | |
| 7,130,616 | B2 | 10/2006 | Janik | |
| 7,143,939 | B2 | 12/2006 | Henzerling | |
| 7,236,773 | B2 | 6/2007 | Thomas | |
| 7,295,548 | B2 | 11/2007 | Blank et al. | |
| 7,391,791 | B2 | 6/2008 | Balassanian et al. | |
| 7,483,538 | B2 | 1/2009 | McCarty et al. | |
| 7,571,014 | B1 | 8/2009 | Lambourne et al. | |
| 7,630,501 | B2 | 12/2009 | Blank et al. | |
| 7,643,894 | B2 | 1/2010 | Braithwaite et al. | |
| 7,657,910 | B1 | 2/2010 | McAulay et al. | |
| 7,853,341 | B2 | 12/2010 | McCarty et al. | |
| 7,895,445 | B1 * | 2/2011 | Albanese | H04L 63/101 713/172 |
| 7,987,294 | B2 | 7/2011 | Bryce et al. | |
| 8,014,423 | B2 | 9/2011 | Thaler et al. | |
| 8,045,952 | B2 | 10/2011 | Qureshey et al. | |
| 8,103,009 | B2 | 1/2012 | McCarty et al. | |
| 8,234,395 | B2 | 7/2012 | Millington | |
| 8,483,853 | B1 | 7/2013 | Lambourne | |
| 8,942,252 | B2 | 1/2015 | Balassanian et al. | |
| 10,965,672 | B2 * | 3/2021 | West, III | H04L 63/0876 |
| 2001/0042107 | A1 | 11/2001 | Palm | |
| 2002/0022453 | A1 | 2/2002 | Balog et al. | |
| 2002/0026442 | A1 | 2/2002 | Lipscomb et al. | |
| 2002/0124097 | A1 | 9/2002 | Isely et al. | |
| 2003/0157951 | A1 | 8/2003 | Hasty | |
| 2004/0024478 | A1 | 2/2004 | Hans et al. | |
| 2007/0142944 | A1 | 6/2007 | Goldberg et al. | |
| 2010/0287607 | A1 * | 11/2010 | Freeman | H04L 12/2812 709/219 |
| 2015/0355879 | A1 | 12/2015 | Beckhardt et al. | |
| 2017/0019394 | A1 * | 1/2017 | Yastrebenetsky | H04L 63/0236 |
| 2017/0223005 | A1 * | 8/2017 | Birgisson | H04L 63/083 |
| 2019/0260597 | A1 * | 8/2019 | Michaud | H04L 9/085 |
| 2020/0314486 | A1 | 10/2020 | Thoresz et al. | |
| 2021/0373841 | A1 | 12/2021 | Bates et al. | |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
International Searching Authority, International Search Report and Written Opinion mailed on May 16, 2025, issued in connection with International Application No. PCT/US2025/013411, filed on Jan. 28, 2025, 18 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc.* v. *D&M* Holdings (No. 14-1330-RGA), DI 219, Claim Construction Opinion (Jan. 12, 2017) (24 pages).
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

ANONYMOUS GUEST DEVICE TOKEN

CROSS-REFERENCE TO RELATED APPLICATIONS

This application claims the benefit of and priority to U.S. Provisional Patent Application Ser. No. 63/626,339 filed on 29 Jan. 2024 and entitled "ANONYMOUS GUEST DEVICE TOKEN," which application is expressly incorporated herein by reference in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1A:
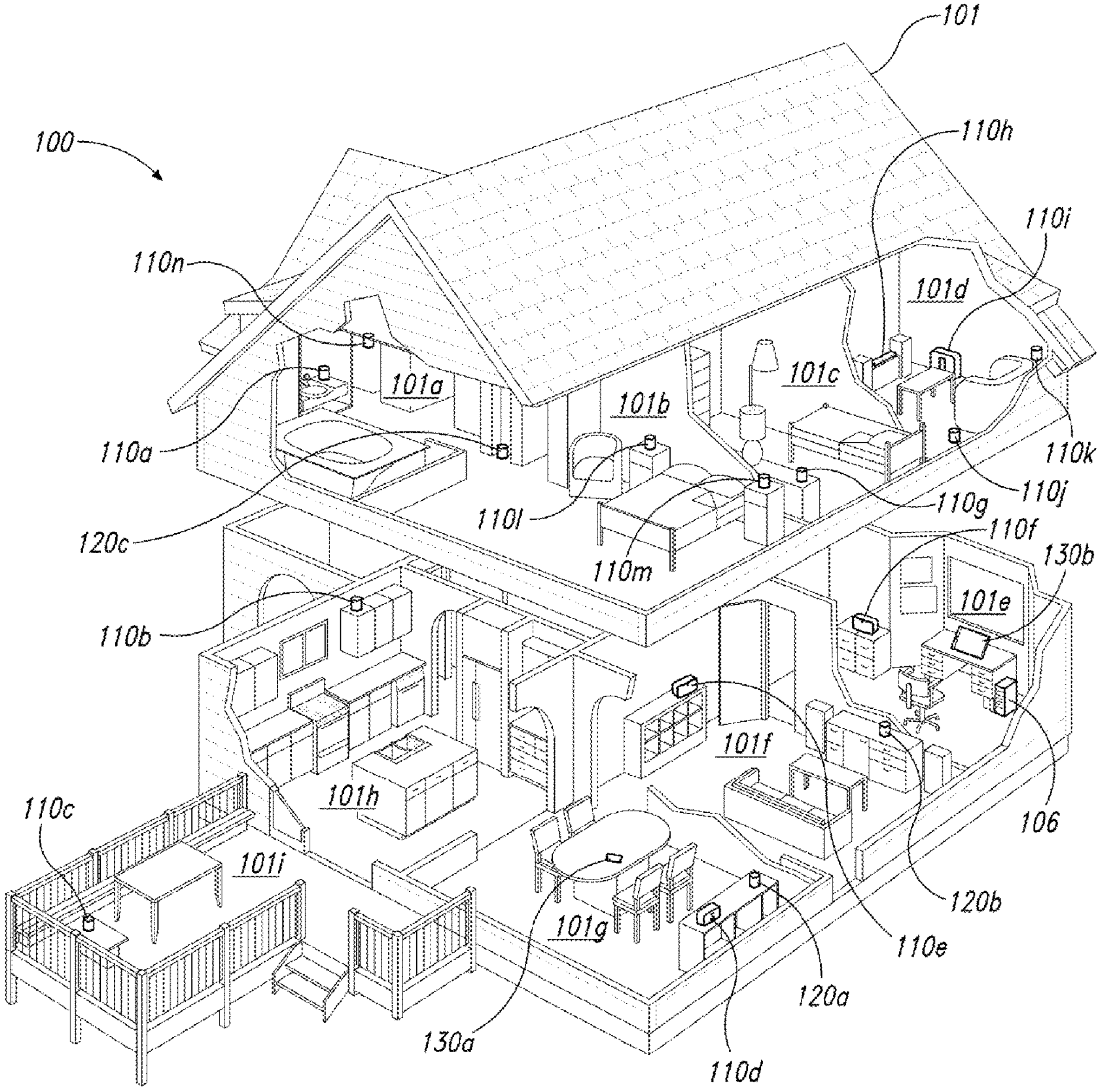
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Embodiments described herein relate to granting anonymous guest access to playback devices on a local area network (LAN). Disclosed embodiments provide a level of authentication/authorization over non-owner devices (e.g., guest devices) that connect to or control a playback device (s) located on the same LAN. The authentication/authorization may be implemented in a manner that allows the guest devices to maintain anonymity while also providing some level of authorization persistence. This system may allow an administrator to limit the guest devices to accessing only services and devices on the LAN where the guest devices are located and services associated with these devices. Accordingly, the system may authenticate that the guest devices are at the same physical location as or co-located with the playback devices via verification that the guest devices are on the same LAN as the playback devices. Once authentication/authorization of a guest device is established, the guest device may be provided with a short-lived token that is used by the guest device to access the playback devices on the same LAN as it and to use associated cloud services attached to the system (e.g., music services, voice services).

In some embodiments, for example, a guest control device comprises at least one processor and at least one non-transitory computer-readable medium comprising program instructions that are executable by the at least one processor such that the guest control device is configured to manage authentication/authorization of guest devices on a LAN. The guest control device may communicate, through a LAN to a first playback device, a self-signed authorization assertion. The guest control device may then receive, from the first playback device, a signed local-access token. The signed local-access token is signed by the first playback device and allows the guest control device to access services provided by playback devices on the local area network. The guest control device then communicates to a cloud network a cloud authorization grant assertion. The cloud authorization grant assertion comprises at least a portion of the signed local-access token. The at least the portion of the signed local-access token comprises an identifier for the first playback device. The guest control device receives, from the cloud network, a cloud guest token, wherein the cloud guest token is signed by the cloud network and allows the guest control device to access services on the local area network that are provided by the cloud network.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110*a-n*), one or more network microphone devices 120 ("NMDs") (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term "NMD" (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation).

In some embodiments, for example, the media playback system 100 is configured to play back audio from a first playback device (e.g., the playback device 100*a*) in synchrony with a second playback device (e.g., the playback device 100*b*). Interactions between the playback devices 110, NMDs 120, and/or control devices 130 of the media playback system 100 configured in accordance with the various embodiments of the disclosure are described in greater detail below with respect to FIGS. 1B-1H.

In the illustrated embodiment of FIG. 1A, the environment 101 comprises a household having several rooms, spaces, and/or playback zones, including (clockwise from upper left) a main bathroom 101*a*, a main bedroom 101*b*, a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed, to form, for example, the configuration shown in FIG. 1A. Each zone may be given a name according to a different room or space such as the office 101*e*, main bathroom 101*a*, main bedroom 101*b*, the second bedroom 101*c*, kitchen

101*h*, dining room 101*g*, living room 101*f*, and/or the balcony 101*i*. In some aspects, a single playback zone may include multiple rooms or spaces. In certain aspects, a single room or space may include multiple playback zones.

In the illustrated embodiment of FIG. 1A, the main bathroom 101*a*, the second bedroom 101*c*, the office 101*e*, the living room 101*f*, the dining room 101*g*, the kitchen 101*h*, and the outdoor patio 101*i* each include one playback device 110, and the main bedroom 101*b* and the den 101*d* include a plurality of playback devices 110. In the main bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E.

In some aspects, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip hop music being played back by playback device 110*c* on the patio 101*i*. In some aspects, the playback devices 110*c* and 110*f* play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
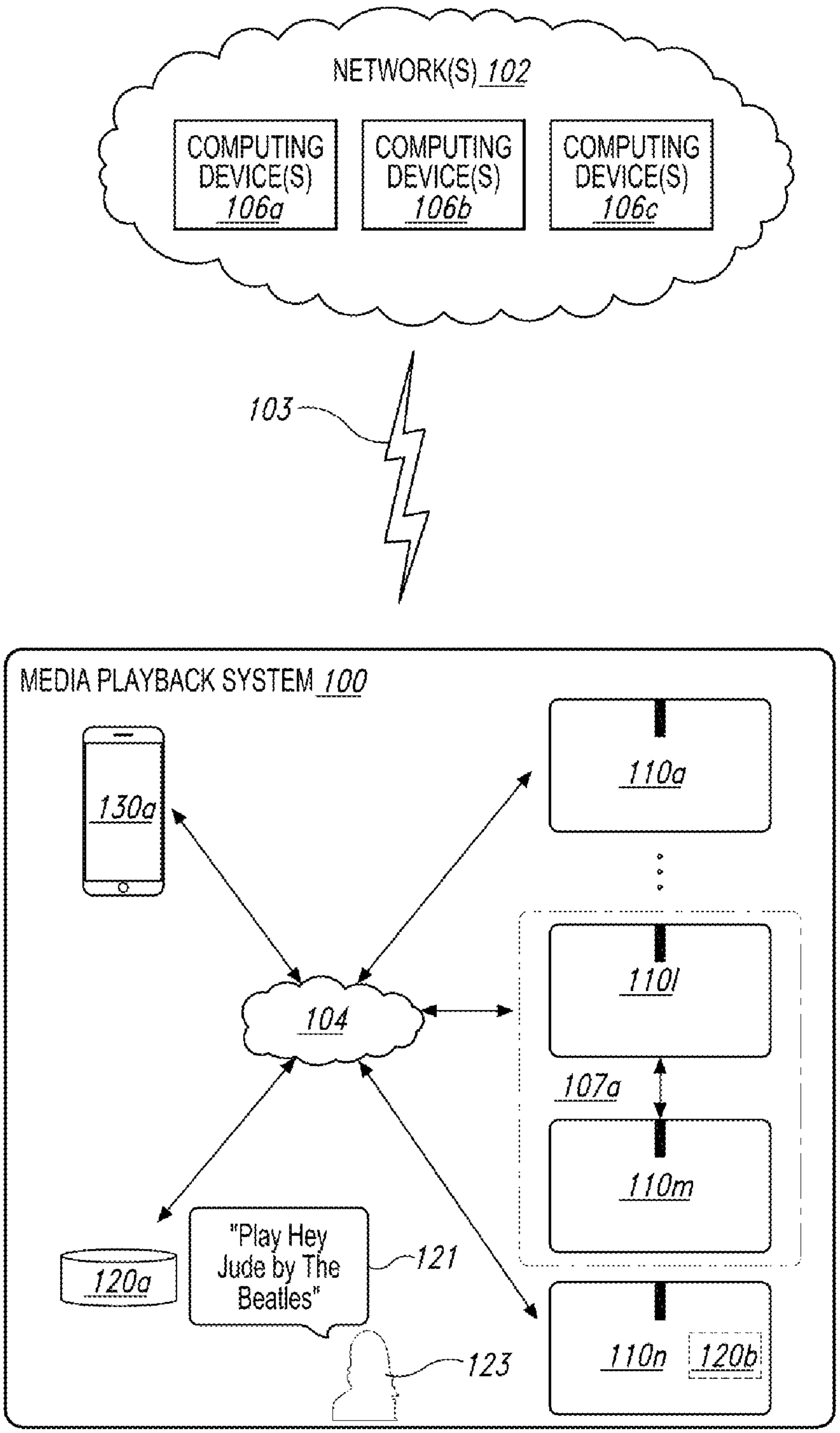
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g., voice input data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, 6 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links. The network 104 may be referred to herein as a "local communication network" to differentiate the network 104 from the cloud network 102 that couples the media playback system 100 to remote devices, such as cloud services.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110. Additional details regarding groups and other arrangements of playback devices are described in further detail below with respect to FIGS. 1-I through IM.

The media playback system 100 includes the NMDs 120*a* and 120*d*, each comprising one or more microphones configured to receive voice utterances from a user. In the illustrated embodiment of FIG. 1B, the NMD 120*a* is a standalone device and the NMD 120*d* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) facilitate one or more operations on behalf of the media playback system 100.

In some aspects, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103.

In response to receiving the voice input data, the computing device 106*c* processes the voice input data (i.e., "Play Hey Jude by The Beatles"), and determines that the processed voice input includes a command to play a song (e.g., "Hey Jude"). In some embodiments, after processing the voice input, the computing device 106*c* accordingly transmits commands to the media playback system 100 to play back "Hey Jude" by the Beatles from a suitable media service (e.g., via one or more of the computing devices 106) on one or more of the playback devices 110. In other embodiments, the computing device 106*c* may be configured to interface with media services on behalf of the media playback system 100. In such embodiments, after processing the voice input, instead of the computing device 106*c* transmitting commands to the media playback system 100 causing the media playback system 100 to retrieve the requested media from a suitable media service, the computing device 106*c* itself causes a suitable media service to provide the requested media to the media playback system 100 in accordance with the user's voice utterance.

b. Suitable Playback Devices

Figure 1C:
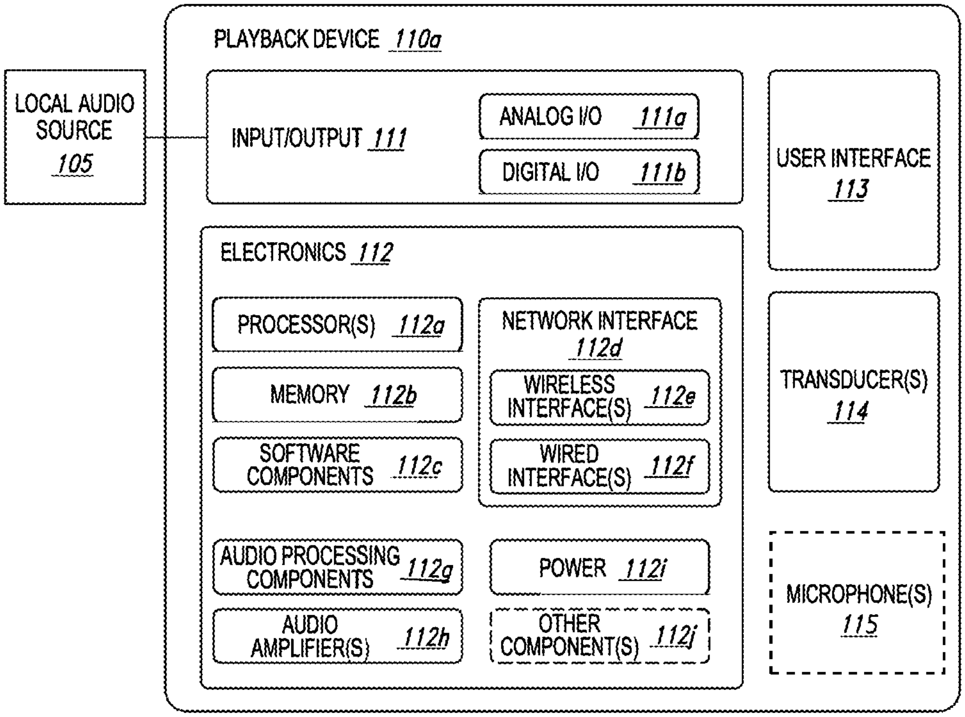
FIG. 1C is a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises an High-Definition Multimedia Interface (HDMI) interface and/or cable. In some embodiments, the digital I/O 111*b* includes one or more wireless communication links comprising, for example, a radio frequency (RF), infrared, WiFi, Bluetooth, or another suitable communication protocol. In certain embodiments, the analog I/O 111*a* and the digital 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 are configured to receive audio from an audio source (e.g., the local audio source 105) via the input/output 111 or one or more of the computing devices 106*a-c* via the network 104 (FIG. 1B)), amplify the received audio, and output the amplified audio for playback via one or more of the transducers 114. In some embodiments, the playback device 110*a* optionally includes one or more microphones 115 (e.g., a single microphone, a plurality of microphones, a microphone array) (hereinafter referred to as "the microphones 115"). In certain embodiments, for example, the playback device 110*a* having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some embodiments, the electronics 112 optionally include one or more other components 112*j* (e.g., one or more sensors, video displays, touchscreens, battery charging bases).

The processors 112*a* can comprise clock-driven computing component(s) configured to process data, and the memory 112*b* can comprise a computer-readable medium (e.g., a tangible, non-transitory computer-readable medium loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio data from an audio source (e.g., one or more of the computing devices 106*a-c* (FIG. 1B)), and/or another one of the playback devices 110. In some embodiments, the operations further include causing the playback device 110*a* to send audio data to another one of the playback devices 110*a* and/or another device (e.g., one of the NMDs 120). Certain embodiments include operations causing the playback device 110*a* to pair with another of the one or more playback devices 110 to enable a multi-channel audio environment (e.g., a stereo pair, a bonded zone).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices can be found, for example, in U.S. Pat. No. 8,234,395, which was incorporated by reference above.

In some embodiments, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112*d* is configured to facilitate a transmission of data between the playback device 110*a* and one or more other devices on a data network such as, for example, the links 103 and/or the network 104 (FIG. 1B). The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated embodiment of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112*d* includes the wired interface 112*f* and excludes the wireless interface 112*e*. In some embodiments, the electronics 112 excludes the network interface 112*d* altogether and transmits and receives media content and/or other data via another communication path (e.g., the input/output 111).

The audio components 112*g* are configured to process and/or filter data comprising media content received by the electronics 112 (e.g., via the input/output 111 and/or the network interface 112*d*) to produce output audio signals. In some embodiments, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112*g* can comprise one or more subcomponents of the processors 112*a*. In some embodiments, the electronics 112 omits the audio processing components 112*g*. In some aspects, for example, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers

112*h* can comprise electronic devices and/or components configured to amplify audio signals to levels sufficient for driving one or more of the transducers 114. In some embodiments, for example, the amplifiers 112*h* include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112*h* comprise a suitable combination of two or more of the foregoing types of power amplifiers. Moreover, in some embodiments, individual ones of the amplifiers 112*h* correspond to individual ones of the transducers 114. In other embodiments, however, the electronics 112 includes a single one of the amplifiers 112*h* configured to output amplified audio signals to a plurality of the transducers 114. In some other embodiments, the electronics 112 omits the amplifiers 112*h*.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
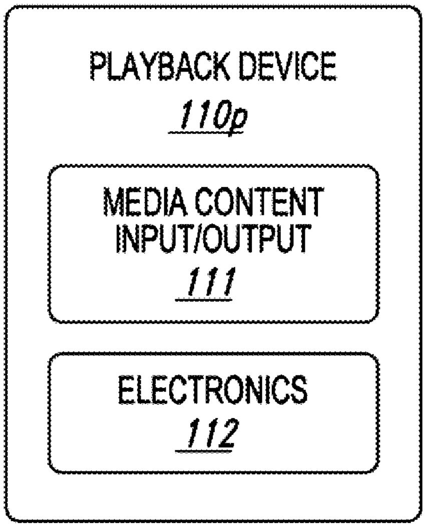
FIG. 1D is a block diagram of a playback device.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110*p* comprising the input/output 111 and electronics 112 without the user interface 113 or transducers 114.

Figure 1E:
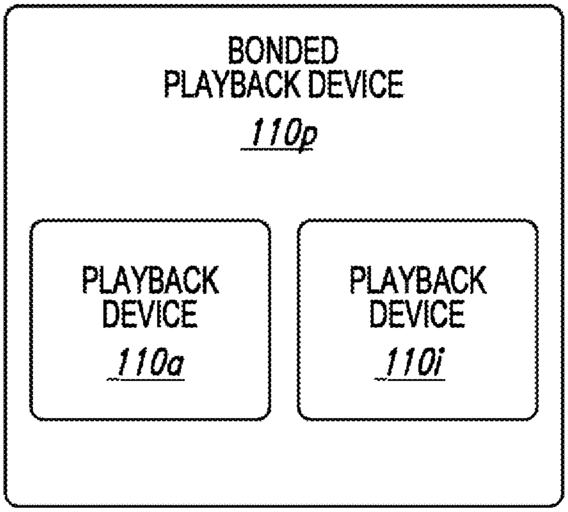
FIG. 1E is a block diagram of a bonded playback device.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated embodiment, the playback devices 110*a* and 110*i* are separate ones of the playback devices 110 housed in separate enclosures. In some embodiments, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some embodiments, for example, the playback device 110*a* is full-range playback device configured to render low frequency, mid-range frequency, and high frequency audio content, and the playback device 110*i* is a subwoofer configured to render low frequency audio content. In some aspects, the playback device 110*a*, when bonded with the first playback device, is configured to render only the mid-range and high frequency components of a particular audio content, while the playback device 110*i* renders the low frequency component of the particular audio content. In some embodiments, the bonded playback device 110*q* includes additional playback devices and/or another bonded playback device. Additional playback device embodiments are described in further detail below with respect to FIGS. 2A-3D.

c. Suitable Network Microphone Devices (NMDs)

Figure 1F:
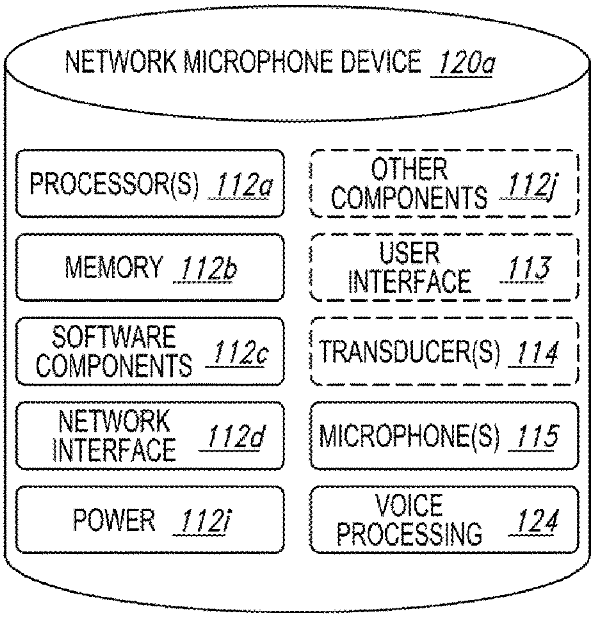
FIG. 1F is a block diagram of a network microphone device.

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some embodiments, the NMD 120*a* is configured as a media playback device (e.g., one or more of the playback devices 110), and further includes, for example, one or more of the audio components 112*g* (FIG. 1C), the amplifiers 112*h*, and/or other playback device components. In certain embodiments, the NMD 120*a* comprises an Internet of Things (IoT) device such as, for example, a thermostat, alarm panel, fire and/or smoke detector, etc. In some embodiments, the NMD 120*a* comprises the microphones 115, the voice processing 124, and only a portion of the components of the electronics 112 described above with respect to FIG. 1B. In some aspects, for example, the NMD 120*a* includes the processor 112*a* and the memory 112*b* (FIG. 1B), while omitting one or more other components of the electronics 112. In some embodiments, the NMD 120*a* includes additional components (e.g., one or more sensors, cameras, thermometers, barometers, hygrometers).

Figure 1G:
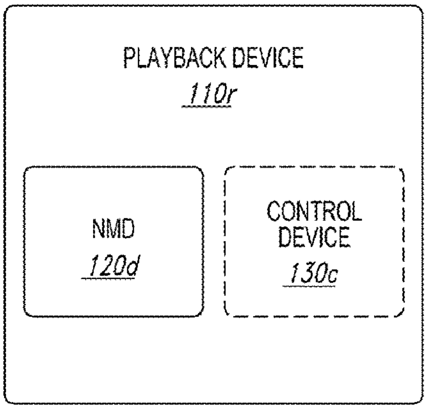
FIG. 1G is a block diagram of a playback device.

In some embodiments, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other embodiments, however, the playback device 110*r* receives commands from another control device (e.g., the control device 130*a* of FIG. 1B). Additional NMD embodiments are described in further detail below with respect to FIGS. 3A-3F.

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

Figure 1H:
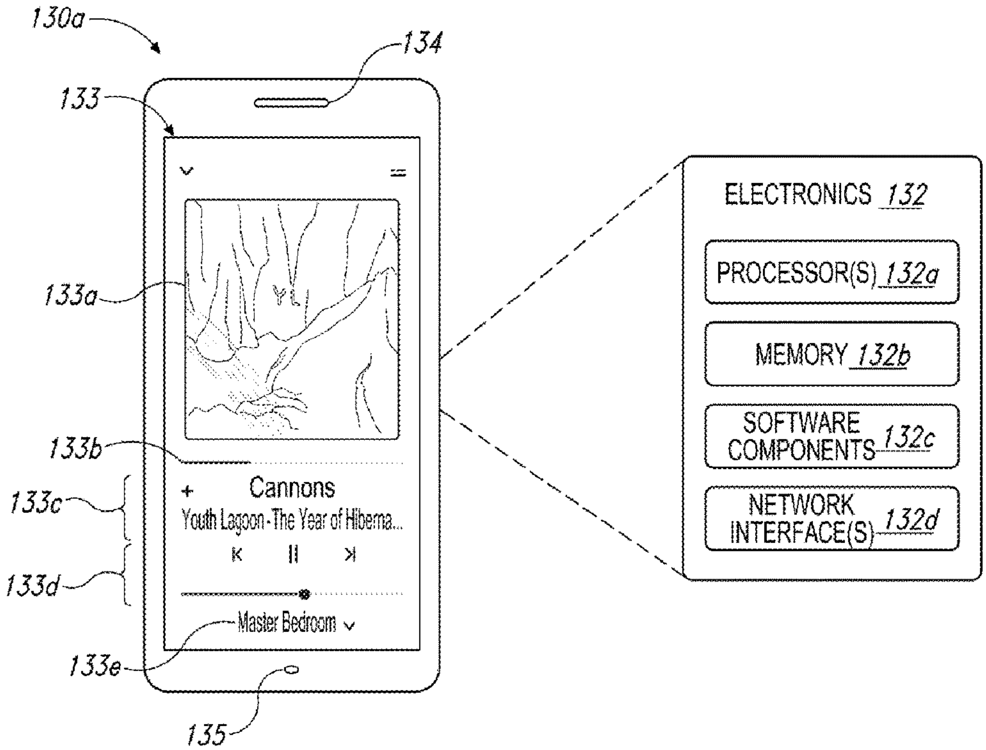
FIG. 1H is a partial schematic diagram of a control device.
Figure 1I:
FIGS. 1-I through 1L are schematic diagrams of corresponding media playback system zones.
FIG. 1M is a schematic diagram of media playback system areas.

FIG. 1H is a partial schematic diagram of the control device 130*a* (FIGS. 1A and 1*i*). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated embodiment, the control device 130*a* comprises a smartphone (e.g., an iPhone™, an Android phone) on which media playback system controller application software is installed. In some embodiments, the control device 130*a* comprises, for example, a tablet (e.g., an iPad™), a computer (e.g., a laptop computer, a desktop computer), and/or another suitable device (e.g., a television, an automobile audio head unit, an IoT device). In certain embodiments, the control device 130*a* comprises a dedicated controller for the media playback system 100. In other embodiments, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 132*a* to perform those functions. The software components 132*c* can comprise applications and/or other executable software configured to facilitate control of the media playback system 100. The memory 132*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some embodiments, the network interface 132*d* is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection) from the control device 130*a* to one or more of the playback devices 110. The network interface 132*d* can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among others. Additional description of zones and groups can be found below with respect to FIGS. 1-I through 1M.

The user interface 133 is configured to receive user input and can facilitate control of the media playback system 100. The user interface 133 includes media content art 133*a* (e.g., album art, lyrics, videos), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130*a*. In some embodiments, the one or more speakers comprise individual transducers configured to correspondingly output low frequencies, mid-range frequencies, and/or high frequencies. In some aspects, for example, the control device 130*a* is configured as a playback device (e.g., one of the playback devices 110). Similarly, in some embodiments the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130*a* is configured to operate as playback device and an NMD. In other embodiments, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones. Additional control device embodiments are described in further detail below with respect to FIGS. 4A-4D and 5.

e. Suitable Playback Device Configurations

FIGS. 1-I through 1M show example configurations of playback devices in zones and zone groups. Referring first to FIG. 1M, in one example, a single playback device may belong to a zone. For example, the playback device 110*g* in the second bedroom 101*c* (FIG. 1A) may belong to Zone C. In some implementations described below, multiple playback devices may be "bonded" to form a "bonded pair" which together form a single zone. For example, the playback device 110*l* (e.g., a left playback device) can be bonded to the playback device 110*m* (e.g., a left playback device) to form Zone A. Bonded playback devices may have different playback responsibilities (e.g., channel responsibilities). In another implementation described below, multiple playback devices may be merged to form a single zone. For example, the playback device 110*h* (e.g., a front playback device) may be merged with the playback device 110*i* (e.g., a subwoofer), and the playback devices 110*j* and 110*k* (e.g., left and right surround speakers, respectively) to form a single Zone D. In another example, the playback devices 110*g* and 110*h* can be merged to form a merged group or a zone group 108*b*. The merged playback devices 110*g* and 110*h* may not be specifically assigned different playback responsibilities. That is, the merged playback devices 110*g* and 110*h* may, aside from playing audio content in synchrony, each play audio content as they would if they were not merged.

Each zone in the media playback system 100 may be provided for control as a single user interface (UI) entity. For example, Zone A may be provided as a single entity named Main Bathroom. Zone B may be provided as a single entity named Main Bedroom. Zone C may be provided as a single entity named Second Bedroom.

Playback devices that are bonded may have different playback responsibilities, such as responsibilities for certain audio channels. For example, as shown in FIG. 1-I, the playback devices 110*l* and 110*m* may be bonded so as to produce or enhance a stereo effect of audio content. In this example, the playback device 110*l* may be configured to play a left channel audio component, while the playback device 110*k* may be configured to play a right channel audio component. In some implementations, such stereo bonding may be referred to as "pairing."

Figure 1J:
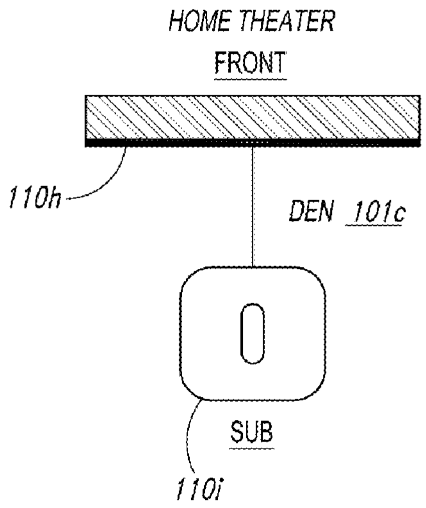
Figure 1K:
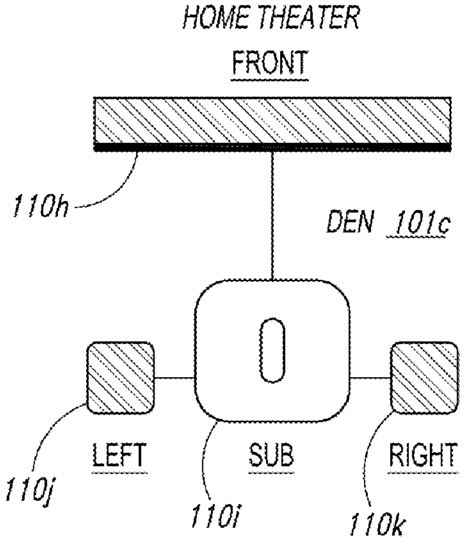
Figure 1L:
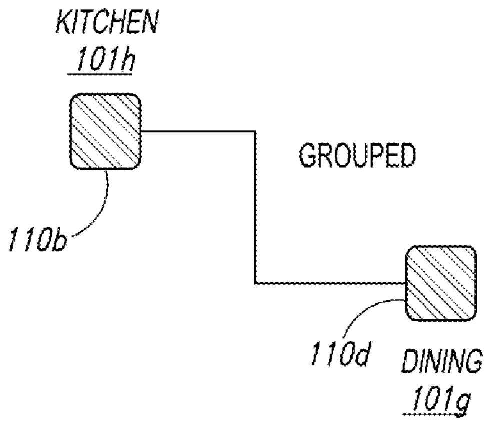
Figure 1M:
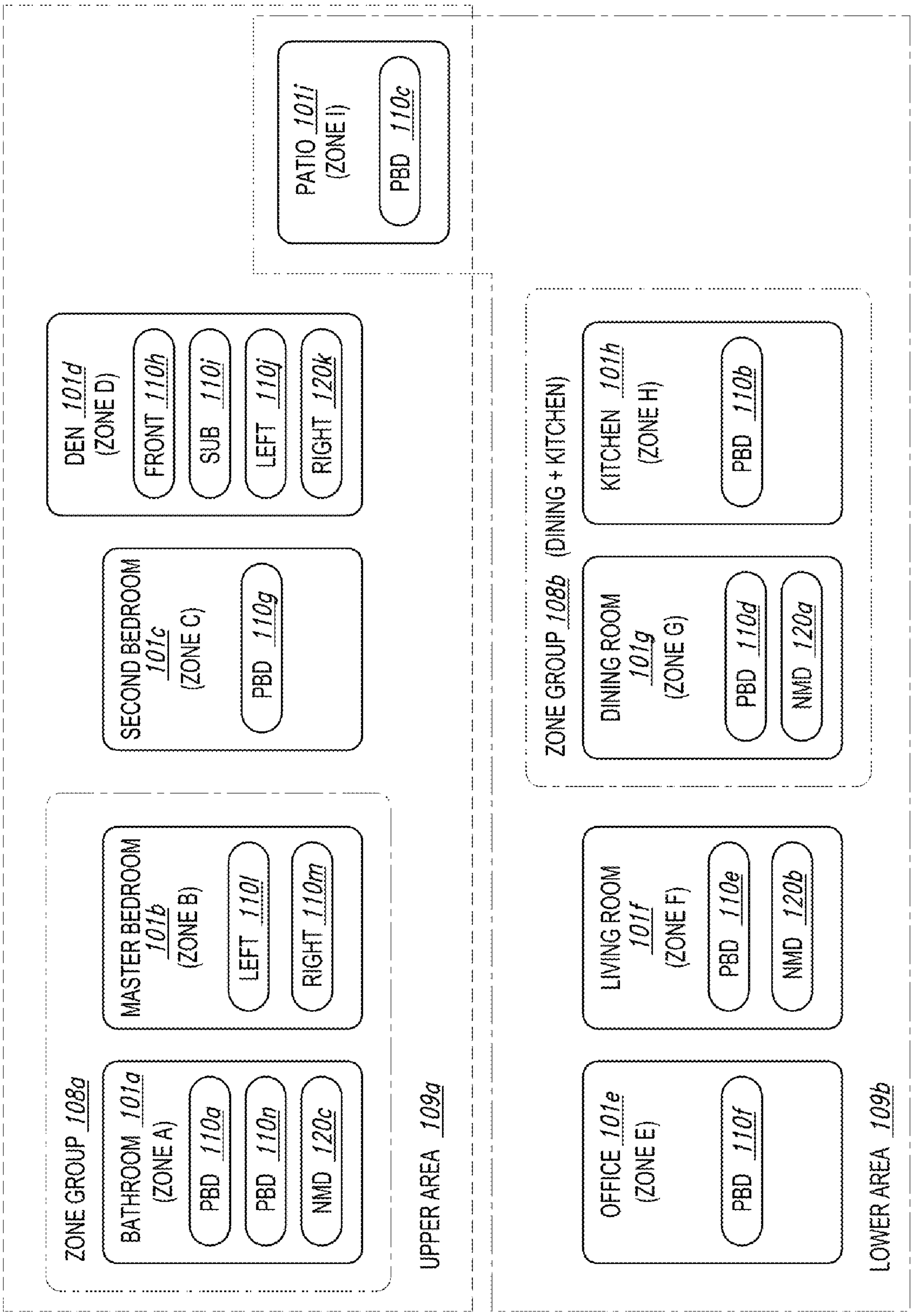

Additionally, bonded playback devices may have additional and/or different respective speaker drivers. As shown in FIG. 1J, the playback device 110*h* named Front may be bonded with the playback device 110*i* named SUB. The Front device 110*h* can be configured to render a range of mid to high frequencies and the SUB device 110*i* can be configured render low frequencies. When unbonded, however, the Front device 110*h* can be configured render a full range of frequencies. As another example, FIG. 1K shows the Front and SUB devices 110*h* and 110*i* further bonded with Left and Right playback devices 110*j* and 110*k*, respectively. In some implementations, the Right and Left devices 110*j* and 102*k* can be configured to form surround or "satellite" channels of a home theater system. The bonded playback devices 110*h*, 110*i*, 110*j*, and 110*k* may form a single Zone D (FIG. 1M).

Playback devices that are merged may not have assigned playback responsibilities and may each render the full range of audio content the respective playback device is capable of. Nevertheless, merged devices may be represented as a single UI entity (i.e., a zone, as discussed above). For instance, the playback devices 110*a* and 110*n* the main bathroom have the single UI entity of Zone A. In one embodiment, the playback devices 110*a* and 110*n* may each output the full range of audio content each respective playback devices 110*a* and 110*n* are capable of, in synchrony.

In some embodiments, an NMD is bonded or merged with another device so as to form a zone. For example, the NMD 120*b* may be bonded with the playback device 110*e*, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108*a* that includes the two zones. Similarly, Zone G may be grouped with Zone H to form the zone group 108*b*. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234, 395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108*b* can be assigned a name such as "Dining+Kitchen", as shown in FIG. 1M. In some embodiments, a zone group may be given a unique name selected by a user.

Certain data may be stored in a memory of a playback device (e.g., the memory 112*c* of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "ci" to identify a zone group to which the zone may belong. As a related example, identifiers associated with the second bedroom 101*c* may indicate that the playback device is the only playback device of the Zone C and not in a zone group. Identifiers associated with the Den may indicate that the Den is not grouped with other zones but includes bonded playback devices 110*h*-110*k*. Identifiers associated with the Dining Room may indicate that the Dining Room is part of the Dining+Kitchen zone group 108*b* and that devices 110*b* and 110*d* are grouped (FIG. 1L). Identifiers associated with the Kitchen may indicate the same or similar information by virtue of the Kitchen being part of the Dining+Kitchen zone group 108*b*. Other example zone variables and identifiers are described below.

In yet another example, the media playback system 100 may store variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109*a* including Zones A-D, and a Lower Area 109*b* including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017, and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

III. Example Systems and Devices

Figure 2A:
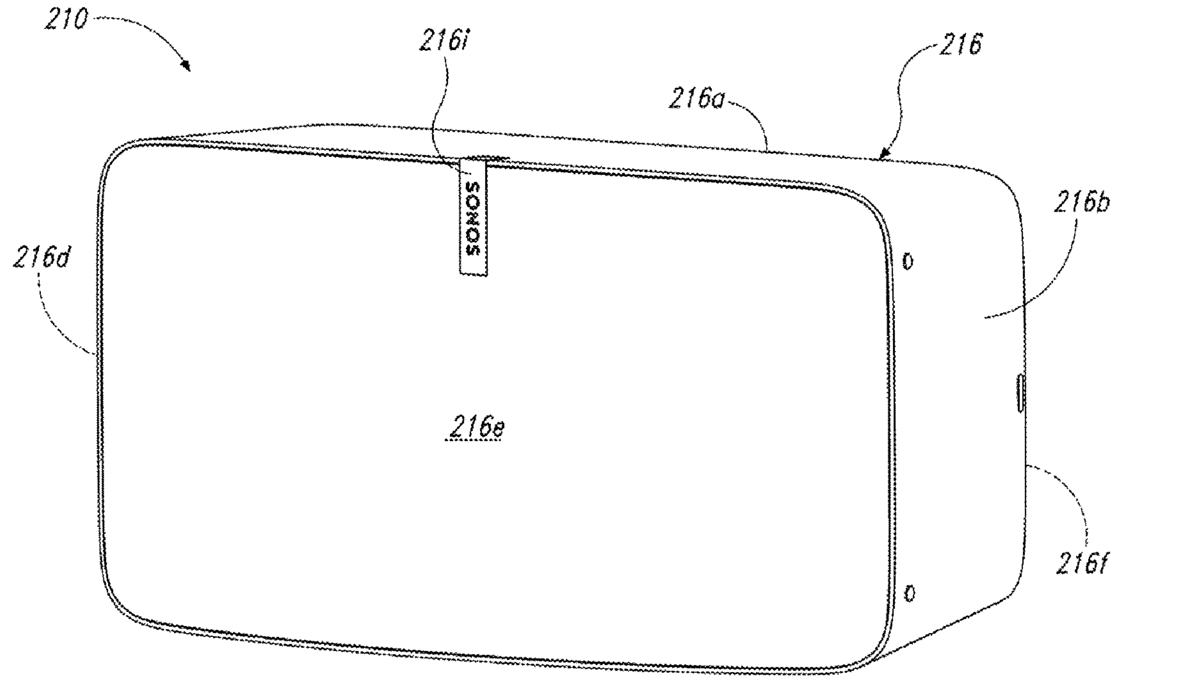
FIG. 2A is a front isometric view of a playback device configured in accordance with aspects of the disclosed technology.
Figure 2B:
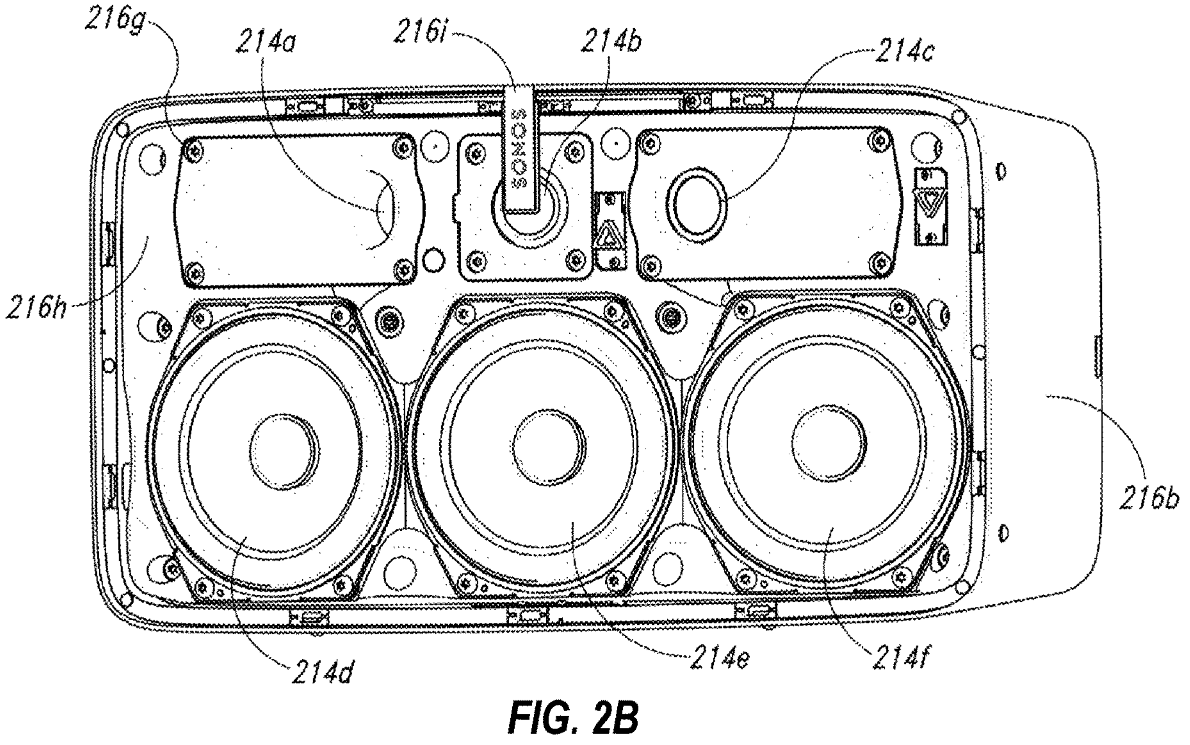
FIG. 2B is a front isometric view of the playback device of FIG. 2A without a grille.
Figure 2C:
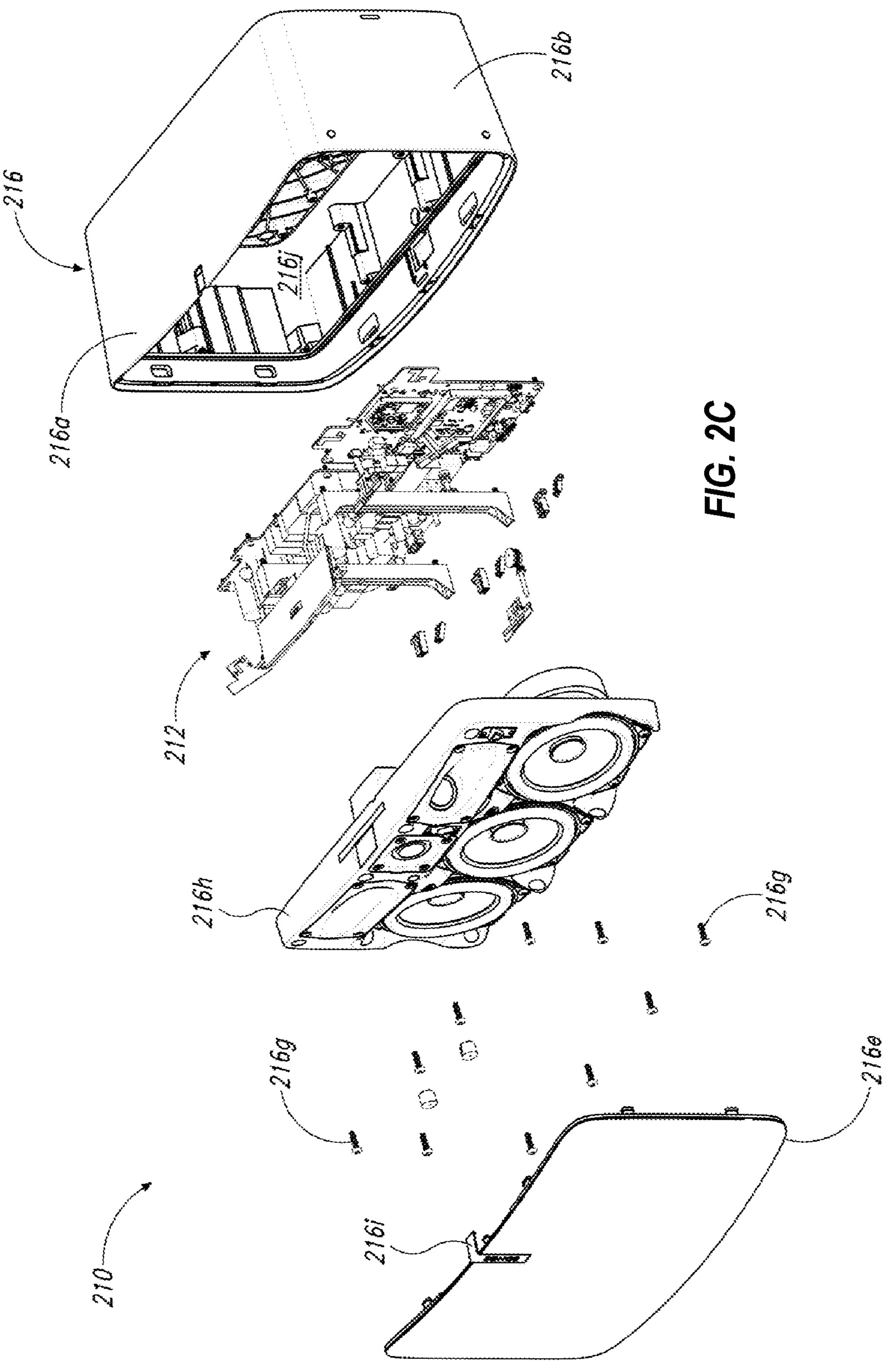
FIG. 2C is an exploded view of the playback device of FIG. 2A.

FIG. 2A is a front isometric view of a playback device 210 configured in accordance with aspects of the disclosed technology. FIG. 2B is a front isometric view of the playback device 210 without a grille 216*e*. FIG. 2C is an exploded view of the playback device 210. Referring to FIGS. 2A-2C together, the playback device 210 comprises a housing 216 that includes an upper portion 216*a*, a right or first side portion 216*b*, a lower portion 216*c*, a left or second side portion 216*d*, the grille 216*e*, and a rear portion 216*f*. A plurality of fasteners 216*g* (e.g., one or more screws, rivets, clips) attaches a frame 216*h* to the housing 216. A cavity 216*j* (FIG. 2C) in the housing 216 is configured to receive the frame 216*h* and electronics 212. The frame 216*h* is configured to carry a plurality of transducers 214 (identified individually in FIG. 2B as transducers 214*a-f*). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 212, and further configured to convert the received electrical signals into audible sound during playback. For instance, the transducers 214*a-c* (e.g., tweeters) can be configured to output high frequency sound (e.g., sound waves having a frequency greater than about 2 kHz). The transducers 214*d-f* (e.g., mid-woofers, woofers, midrange speakers) can be configured output sound at frequencies lower than the transducers 214*a-c* (e.g., sound waves having a frequency lower than about 2 kHz). In some embodiments, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216*i* is axially aligned with the transducer 214*b*. The filter 216*i* can be configured to desirably attenuate a predetermined range of frequencies that the transducer 214*b* outputs to improve sound quality and a perceived sound stage output collectively by the transducers 214. In some embodiments, however, the playback device 210 omits the filter 216*i*. In other embodiments, the playback device 210 includes one or more additional filters aligned with the transducers 214*b* and/or at least another of the transducers 214.

Figure 3A:
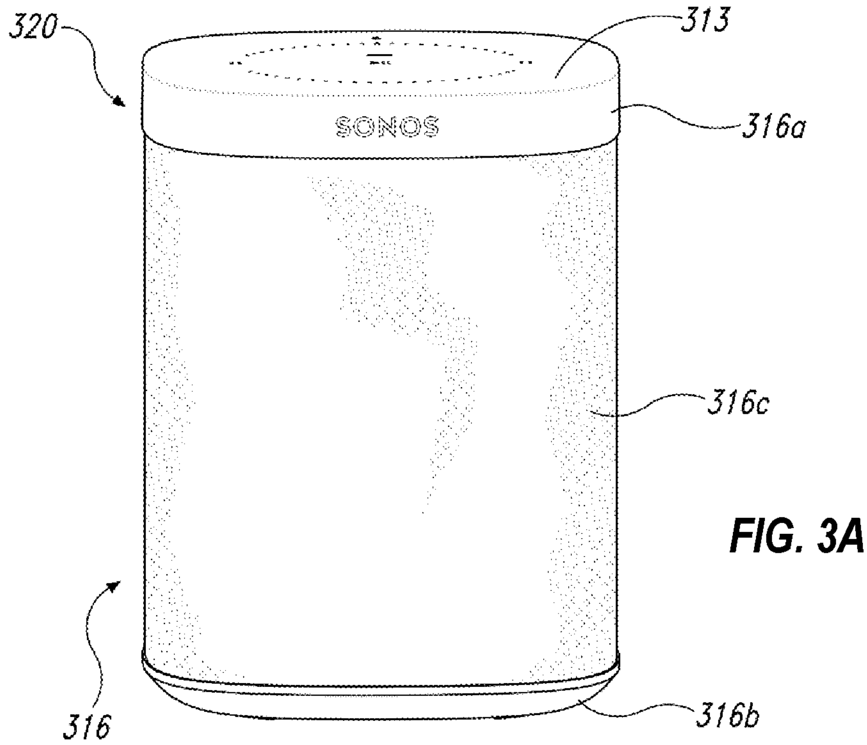
FIG. 3A is a front view of a network microphone device configured in accordance with aspects of the disclosed technology.
Figure 3B:
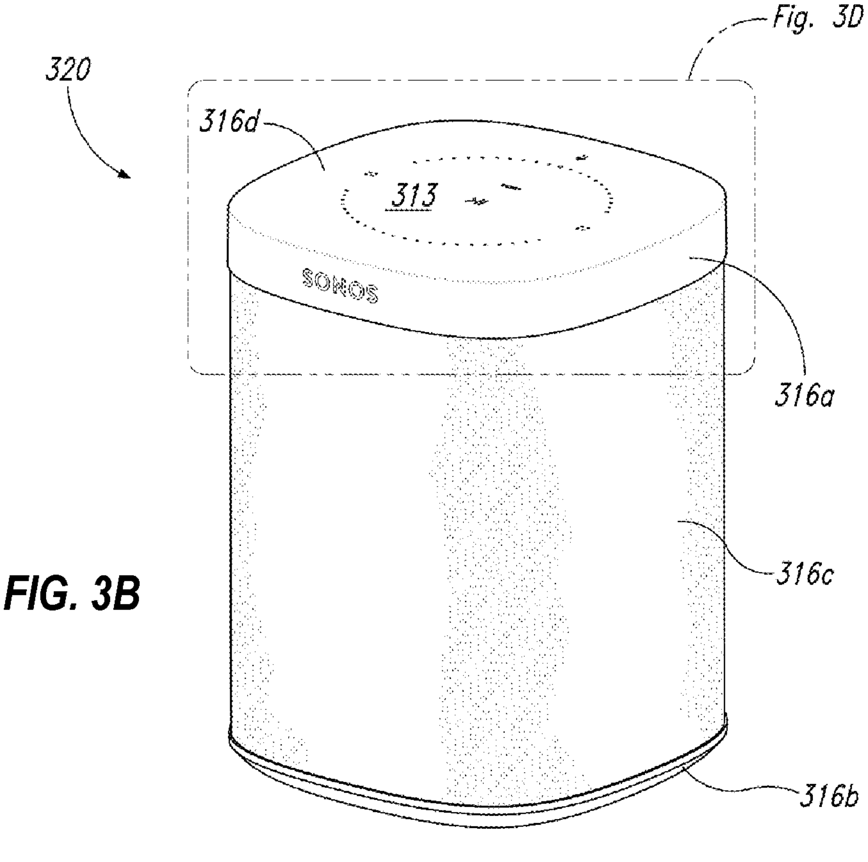
FIG. 3B is a side isometric view of the network microphone device of FIG. 3A.
Figure 3C:
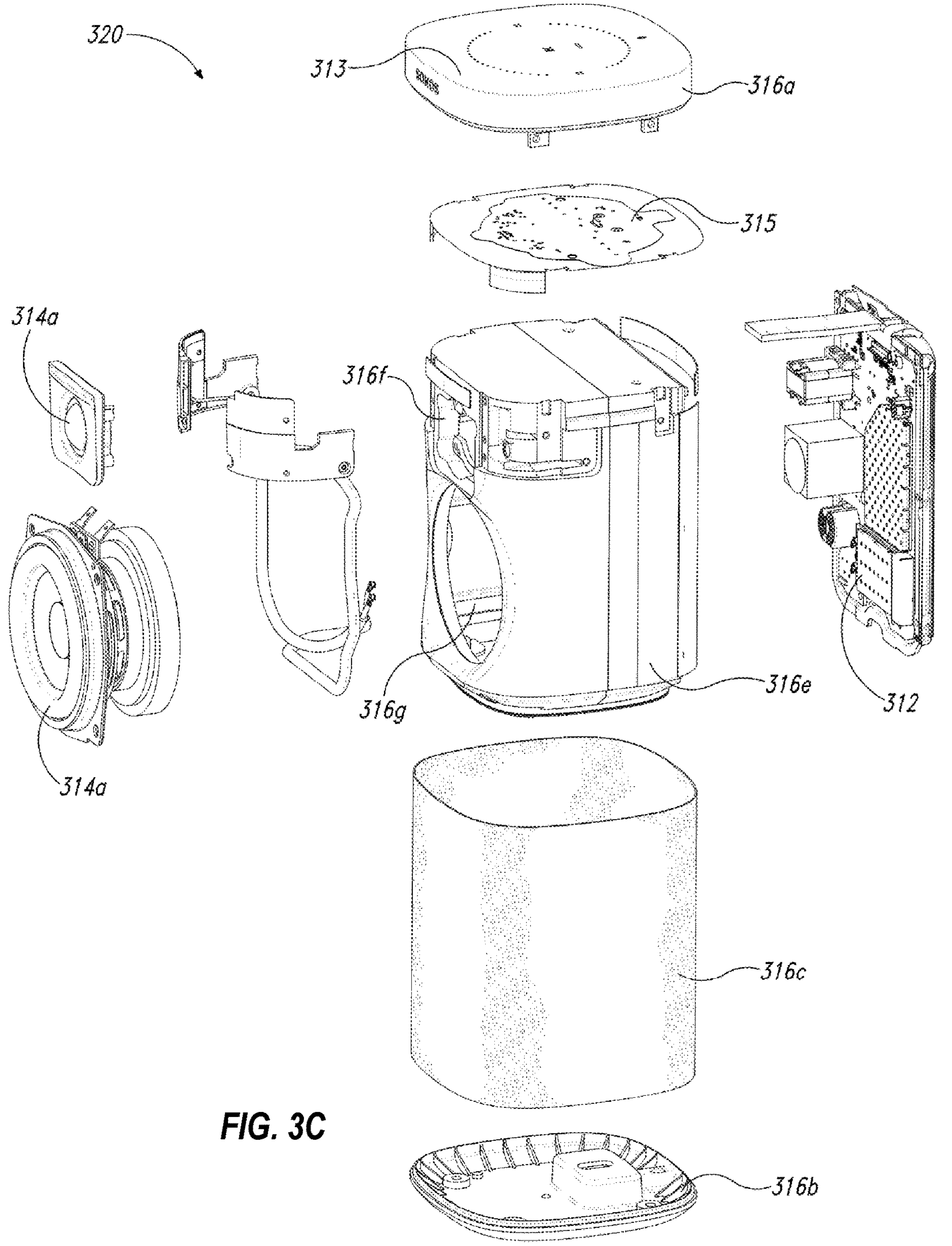
FIG. 3C is an exploded view of the network microphone device of FIGS. 3A and 3B.
Figure 3D:
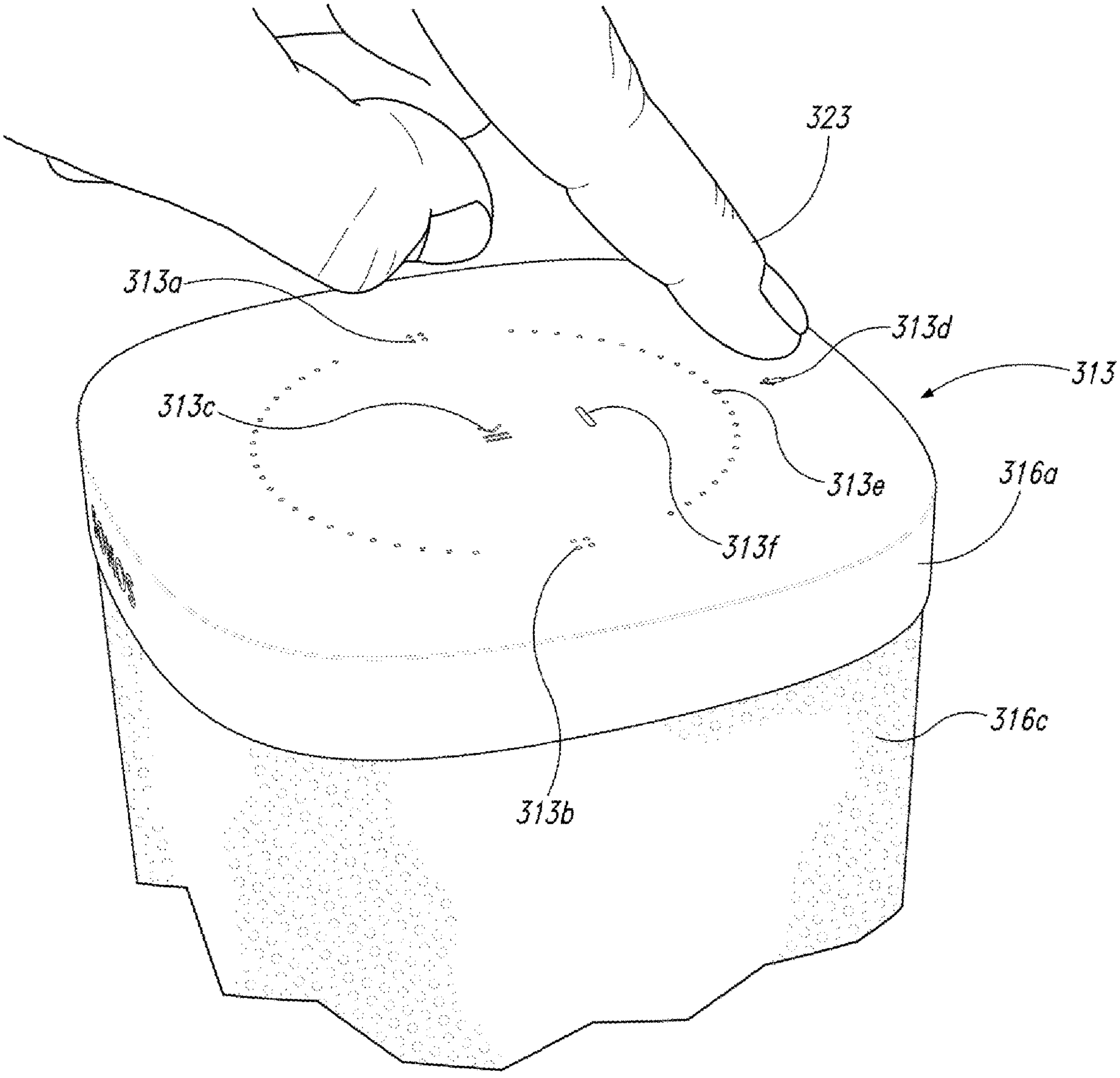
FIG. 3D is an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316*a*, a lower portion 316*b* and an intermediate portion 316*c* (e.g., a grille). A plurality of ports, holes or apertures 316*d* in the upper portion 316*a* allow sound to pass through to one or more microphones 315 (FIG. 3C) positioned within the housing 316. The one or more microphones 315 are configured to received sound via the apertures 316*d* and produce electrical signals based on the received sound. In the illustrated embodiment, a frame 316*e* (FIG. 3C) of the housing 316 surrounds cavities 316*f* and 316*g* configured to house, respectively, a first transducer 314*a* (e.g., a tweeter) and a second transducer 314*b* (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314*a* and 314*b* altogether.

Electronics 312 (FIG. 3C) includes components configured to drive the transducers 314*a* and 314*b*, and further configured to analyze audio data corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112*a*, the memory 112*b*, the software components 112*c*, the network interface 112*d*, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313*a* (e.g., a previous control), a second control surface 313*b* (e.g., a next control), and a third control surface 313*c* (e.g., a play and/or pause control). A fourth control surface 313*d* is configured to receive touch input corresponding to activation and deactivation of the one or microphones 315. A first indicator 313*e* (e.g., one or more light emitting diodes (LEDs) or another suitable illuminator) can be configured to illuminate only when the one or more microphones 315 are activated. A second indicator 313*f* (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313*e*, omitting the second indicator 313*f*. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10 m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson).

The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

Figure 3E:
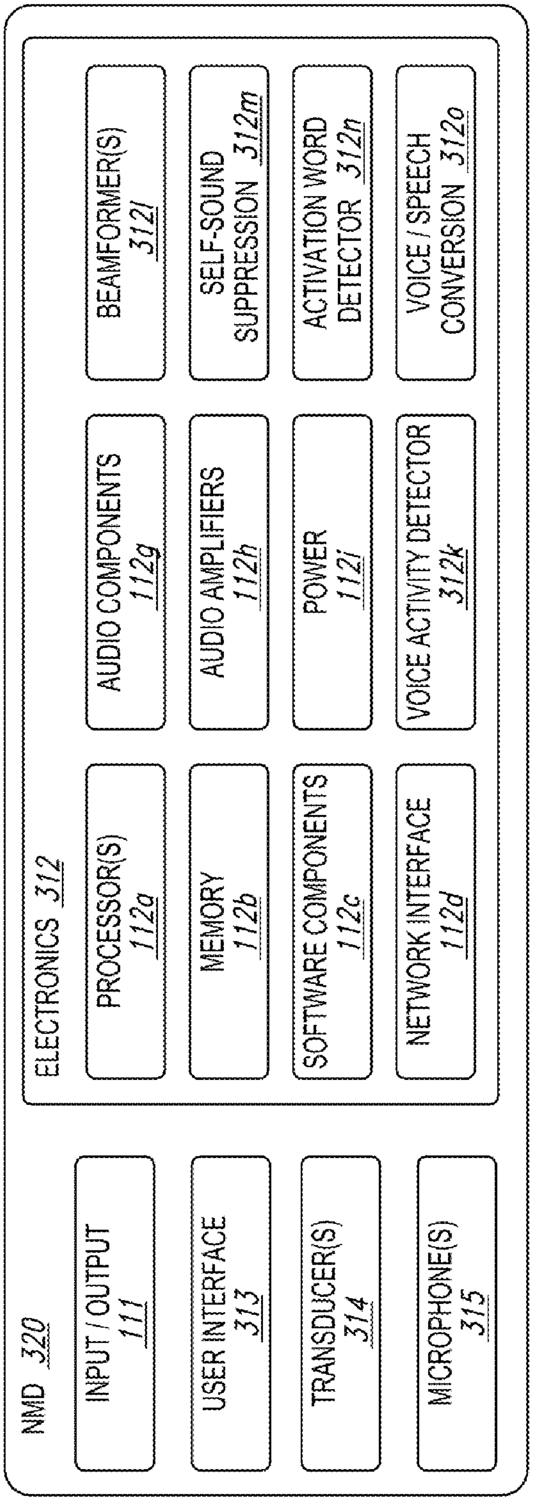
FIG. 3E is a block diagram of the network microphone device of FIGS. 3A-3D

FIG. 3E is a functional block diagram showing additional features of the NMD 320 in accordance with aspects of the disclosure. The NMD 320 includes components configured to facilitate voice command capture including voice activity detector component(s) 312*k*, beam former components 312*l*, acoustic echo cancellation (AEC) and/or self-sound suppression components 312*m*, activation word detector components 312*n*, and voice/speech conversion components 312*o* (e.g., voice-to-text and text-to-voice). In the illustrated embodiment of FIG. 3E, the foregoing components 312*k*-312*o* are shown as separate components. In some embodiments, however, one or more of the components 312*k*-312*o* are subcomponents of the processors 112*a*.

The beamforming and self-sound suppression components 312*l* and 312*m* are configured to detect an audio signal and determine aspects of voice input represented in the detected audio signal, such as the direction, amplitude, frequency spectrum, etc. The voice activity detector activity components 312*k* are operably coupled with the beamforming and AEC components 312*l* and 312*m* and are configured to determine a direction and/or directions from which voice activity is likely to have occurred in the detected audio signal. Potential speech directions can be identified by monitoring metrics which distinguish speech from other sounds. Such metrics can include, for example, energy within the speech band relative to background noise and entropy within the speech band, which is measure of spectral structure. As those of ordinary skill in the art will appreciate, speech typically has a lower entropy than most common background noise.

The activation word detector components 312*n* are configured to monitor and analyze received audio to determine if any activation words (e.g., wake words) are present in the received audio. The activation word detector components 312*n* may analyze the received audio using an activation word detection algorithm. If the activation word detector 312*n* detects an activation word, the NMD 320 may process voice input contained in the received audio. Example activation word detection algorithms accept audio as input and provide an indication of whether an activation word is present in the audio. Many first- and third-party activation word detection algorithms are known and commercially available. For instance, operators of a voice service may make their algorithm available for use in third-party devices. Alternatively, an algorithm may be trained to detect certain activation words. In some embodiments, the activation word detector 312*n* runs multiple activation word detection algorithms on the received audio simultaneously (or substantially simultaneously). As noted above, different voice services (e.g. AMAZON's ALEXA®, APPLE's SIRI®, or MICROSOFT's CORTANA®) can each use a different activation word for invoking their respective voice service.

To support multiple services, the activation word detector 312*n* may run the received audio through the activation word detection algorithm for each supported voice service in parallel.

The speech/text conversion components 312*o* may facilitate processing by converting speech in the voice input to text. In some embodiments, the electronics 312 can include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional voice activity services, which typically sample from a broad base of users and diverse requests that are not targeted to media playback systems.

Figure 3F:
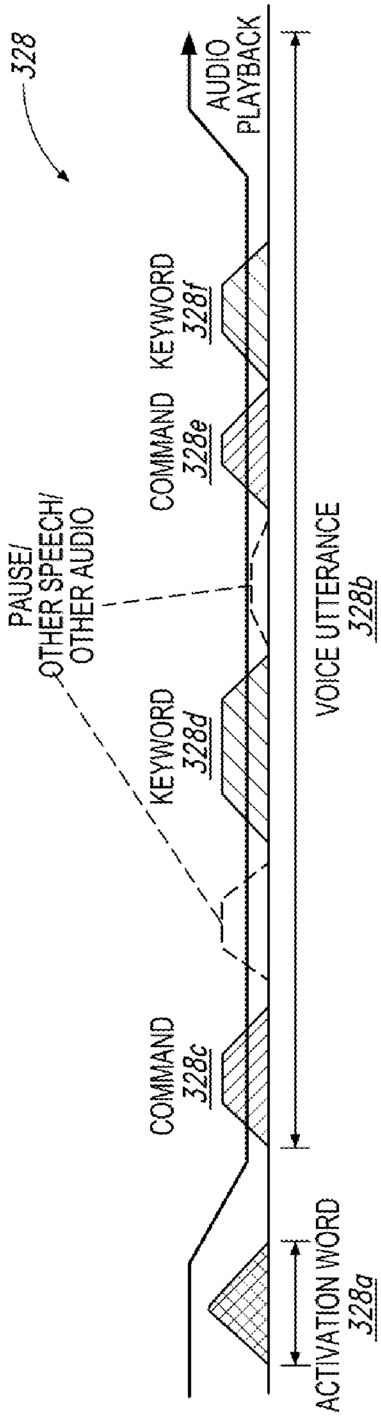
FIG. 3F is a schematic diagram of an example voice input.

FIG. 3F is a schematic diagram of an example voice input 328 captured by the NMD 320 in accordance with aspects of the disclosure. The voice input 328 can include a activation word portion 328*a* and a voice utterance portion 328*b*. In some embodiments, the activation word 557*a* can be a known activation word, such as "Alexa," which is associated with AMAZON's ALEXA®. In other embodiments, however, the voice input 328 may not include a activation word. In some embodiments, a network microphone device may output an audible and/or visible response upon detection of the activation word portion 328*a*. In addition or alternately, an NMD may output an audible and/or visible response after processing a voice input and/or a series of voice inputs.

The voice utterance portion 328*b* may include, for example, one or more spoken commands (identified individually as a first command 328*c* and a second command 328*e*) and one or more spoken keywords (identified individually as a first keyword 328*d* and a second keyword 328*f*). In one example, the first command 328*c* can be a command to play music, such as a specific song, album, playlist, etc. In this example, the keywords may be one or more words identifying one or more zones in which the music is to be played, such as the Living Room and the Dining Room shown in FIG. 1A. In some examples, the voice utterance portion 328*b* can include other information, such as detected pauses (e.g., periods of non-speech) between words spoken by a user, as shown in FIG. 3F. The pauses may demarcate the locations of separate commands, keywords, or other information spoke by the user within the voice utterance portion 328*b*.

In some embodiments, the media playback system 100 is configured to temporarily reduce the volume of audio content that it is playing while detecting the activation word portion 328*a*. The media playback system 100 may restore the volume after processing the voice input 328, as shown in FIG. 3F. Such a process can be referred to as ducking, examples of which are disclosed in U.S. patent application Ser. No. 15/438,749, incorporated by reference herein in its entirety.

Figure 4A:
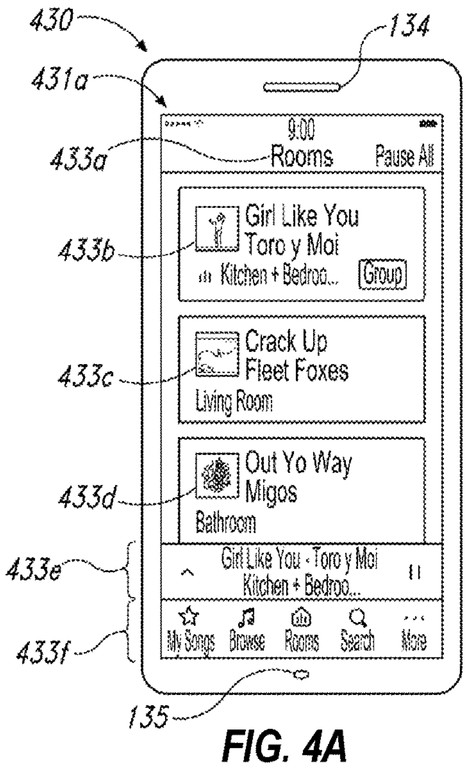
FIGS. 4A-4D are schematic diagrams of a control device in various stages of operation in accordance with aspects of the disclosed technology.
Figure 4B:
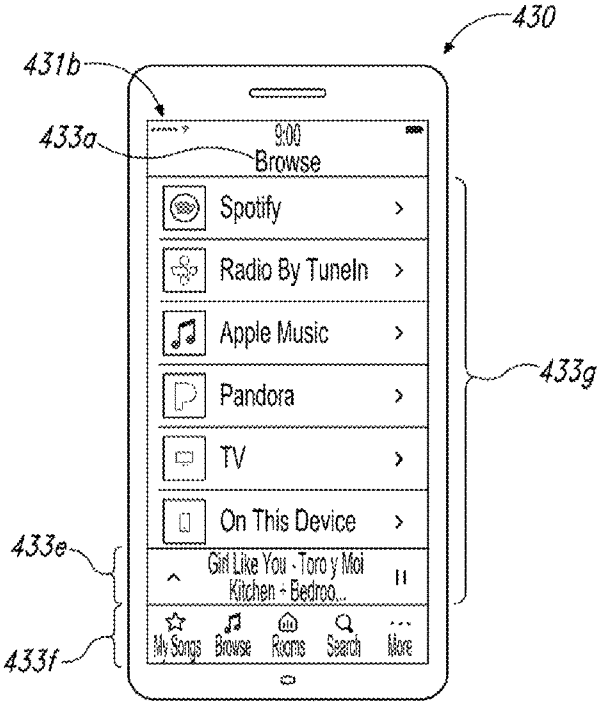
Figure 4C:
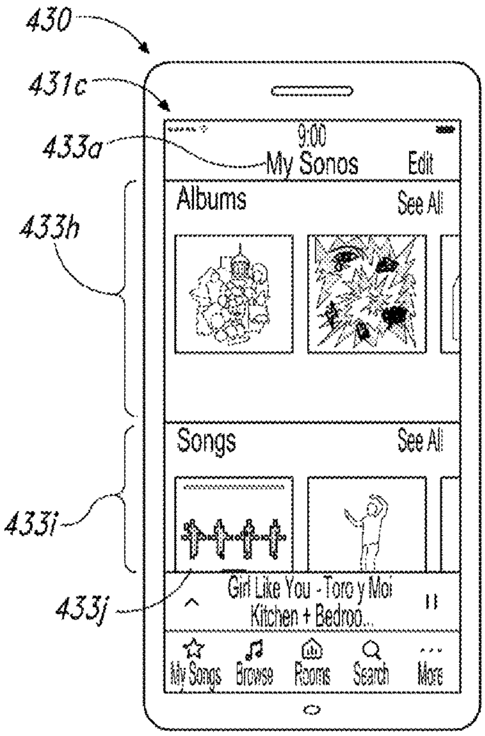
Figure 4D:
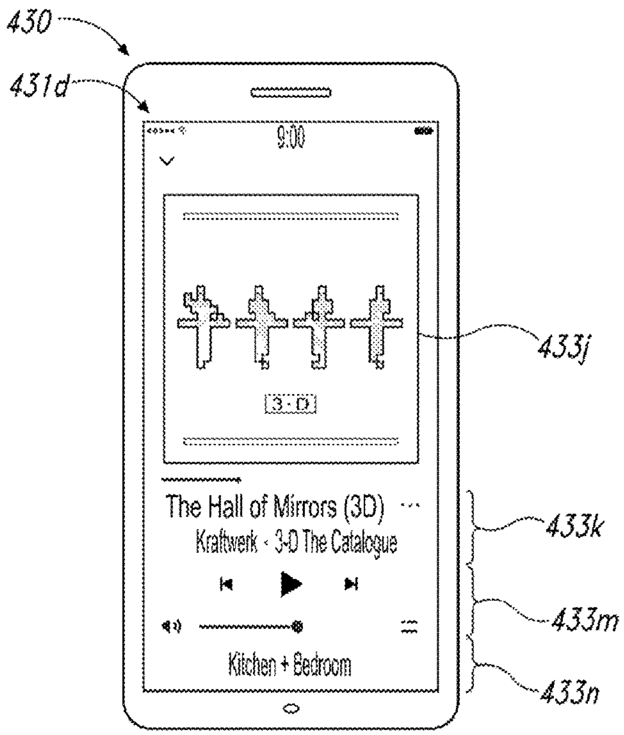

FIGS. 4A-4D are schematic diagrams of a control device 430 (e.g., the control device 130*a* of FIG. 1H, a smartphone, a tablet, a dedicated control device, an IoT device, and/or another suitable device) showing corresponding user interface displays in various states of operation. A first user interface display 431*a* (FIG. 4A) includes a display name 433*a* (i.e., "Rooms"). A selected group region 433*b* displays audio content information (e.g., artist name, track name, album art) of audio content played back in the selected group and/or zone. Group regions 433*c* and 433*d* display corresponding group and/or zone name, and audio content information audio content played back or next in a playback queue of the respective group or zone. An audio content region 433*e* includes information related to audio content in the selected group and/or zone (i.e., the group and/or zone indicated in the selected group region 433*b*). A lower display region 433*f* is configured to receive touch input to display one or more other user interface displays. For example, if a user selects "Browse" in the lower display region 433*f*, the control device 430 can be configured to output a second user interface display 431*b* (FIG. 4B) comprising a plurality of music services 433*g* (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433*f*, the control device 430 can be configured to output a third user interface display 431*c* (FIG. 4C). A first media content region 433*h* can include graphical representations (e.g., album art) corresponding to individual albums, stations, or playlists. A second media content region 433*i* can include graphical representations (e.g., album art) corresponding to individual songs, tracks, or other media content. If the user selects a graphical representation 433*j* (FIG. 4C), the control device 430 can be configured to begin play back of audio content corresponding to the graphical representation 433*j* and output a fourth user interface display 431*d*. The fourth user interface display 431*d* includes an enlarged version of the graphical representation 433*j*, media content information 433*k* (e.g., track name, artist, album), transport controls 433*m* (e.g., play, previous, next, pause, volume), and indication 433*n* of the currently selected group and/or zone name.

Figure 5:
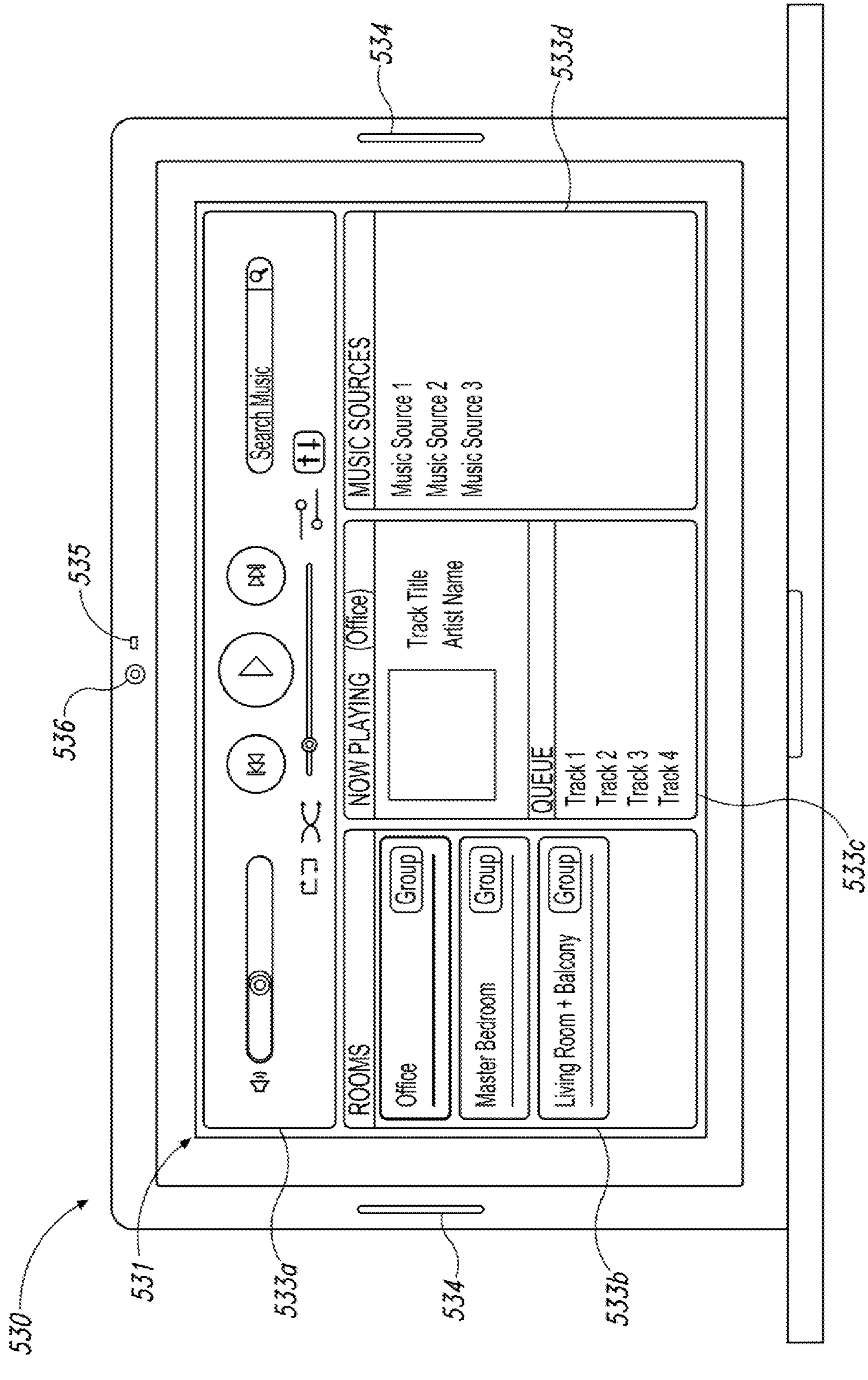
FIG. 5 is front view of a control device.

FIG. 5 is a schematic diagram of a control device 530 (e.g., a laptop computer, a desktop computer). The control device 530 includes transducers 534, a microphone 535, and a camera 536. A user interface 531 includes a transport control region 533*a*, a playback status region 533*b*, a playback zone region 533*c*, a playback queue region 533*d*, and a media content source region 533*e*. The transport control region comprises one or more controls for controlling media playback including, for example, volume, previous, play/pause, next, repeat, shuffle, track position, crossfade, equalization, etc. The audio content source region 533*e* includes a listing of one or more media content sources from which a user can select media items for play back and/or adding to a playback queue.

The playback zone region 533*b* can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533*b* can be dynamically updated as playback zone or zone group configurations are modified.

The playback status region 533*c* includes graphical representations of audio content that is presently being played, previously played, or scheduled to play next in the selected playback zone or zone group. The selected playback zone or zone group may be visually distinguished on the user interface, such as within the playback zone region 533*b* and/or the playback queue region 533*d*. The graphical representations may include track title, artist name, album name, album year, track length, and other relevant information that may be useful for the user to know when controlling the media playback system 100 via the user interface 531.

The playback queue region 533*d* includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 6:
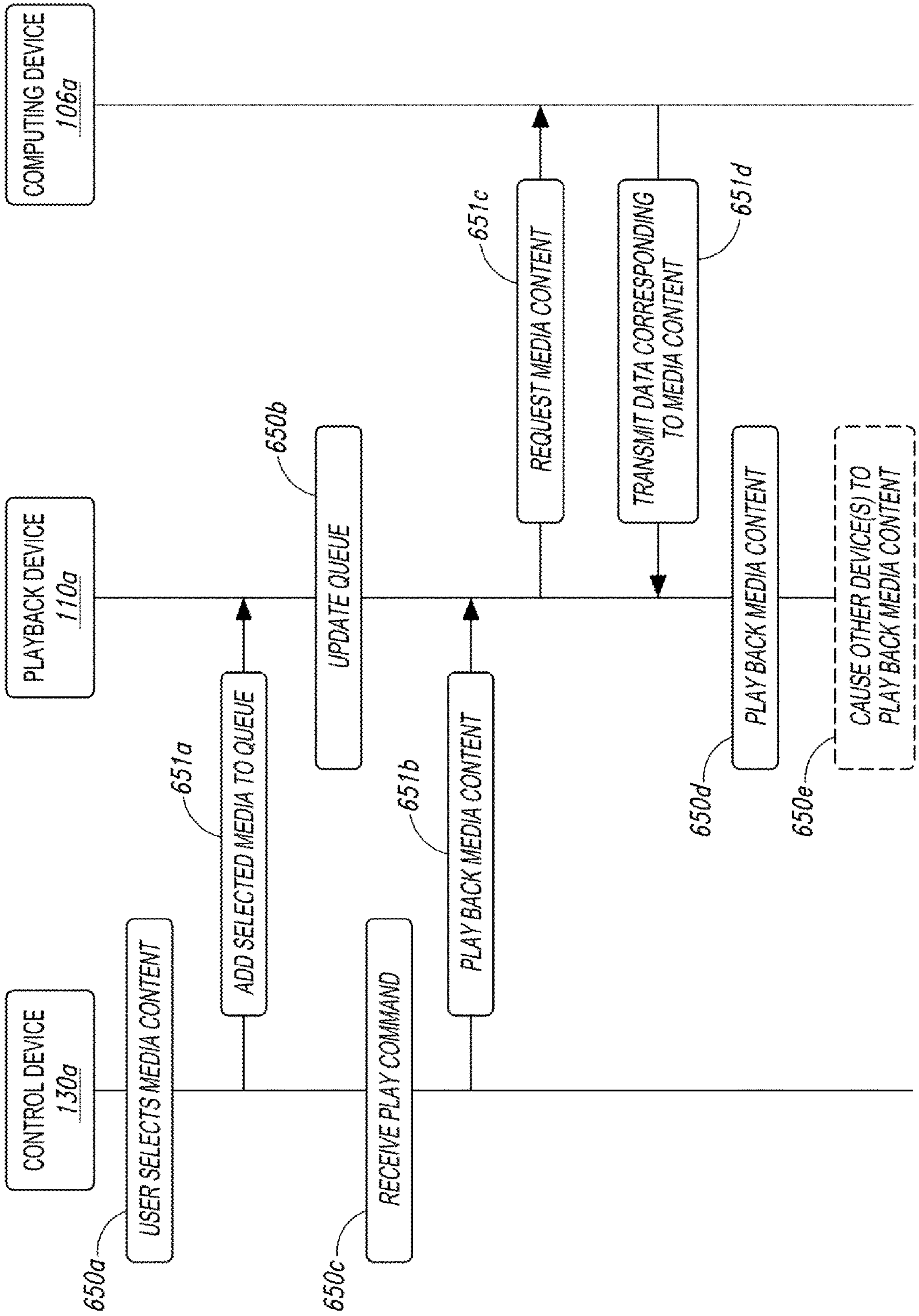
FIG. 6 is a message flow diagram of a media playback system.

FIG. 6 is a message flow diagram illustrating data exchanges between devices of the media playback system 100 (FIGS. 1A-1M).

At step 650*a*, the media playback system 100 receives an indication of selected media content (e.g., one or more songs, albums, playlists, podcasts, videos, stations) via the control device 130*a*. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130*a* transmits a message 651*a* to the playback device 110*a* (FIGS. 1A-1C) to add the selected media content to a playback queue on the playback device 110*a*.

At step 650*b*, the playback device 110*a* receives the message 651*a* and adds the selected media content to the playback queue for play back.

At step 650*c*, the control device 130*a* receives input corresponding to a command to play back the selected media content. In response to receiving the input corresponding to the command to play back the selected media content, the control device 130*a* transmits a message 651*b* to the playback device 110*a* causing the playback device 110*a* to play back the selected media content. In response to receiving the message 651*b*, the playback device 110*a* transmits a message 651*c* to the computing device 106*a* requesting the selected media content. The computing device 106*a*, in response to receiving the message 651*c*, transmits a message 651*d* comprising data (e.g., audio data, video data, a URL, a URI) corresponding to the requested media content.

At step 650*d*, the playback device 110*a* receives the message 651*d* with the data corresponding to the requested media content and plays back the associated media content.

At step 650*e*, the playback device 110*a* optionally causes one or more other devices to play back the selected media content. In one example, the playback device 110*a* is one of a bonded zone of two or more players (FIG. 1M). The playback device 110*a* can receive the selected media content and transmit all or a portion of the media content to other devices in the bonded zone. In another example, the playback device 110*a* is a coordinator of a group and is configured to transmit and receive timing information from one or more other devices in the group. The other one or more devices in the group can receive the selected media content from the computing device 106*a*, and begin playback of the selected media content in response to a message from the playback device 110*a* such that all of the devices in the group play back the selected media content in synchrony.

III. Guest Device Authentication

As discussed above, media playback systems 100, often include multiple devices (e.g., playback devices 110) that communicate with each other to provide a seamless user experience. These devices may include playback devices 110, control devices 130, and other components that work together to deliver audio, video, and other types of content to users. In many cases, these devices are associated with a user account, which allows the system to personalize the user experience and provide access to user-specific content and settings. As used for the present discussion, a media playback system 100 comprises devices that are present on the same LAN. Further, as used herein, a LAN comprises a collection of devices connected together in one physical location, such as a building, office, or home. For example, the LAN may comprise one or more of a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication).

Disclosed embodiments allow a device-level account that is not linked to a person's identity to be generated. This device-level account serves as a form of identification for devices that are not associated with an authenticated user account. The generation of a device-level account can be beneficial in scenarios where devices, such as controllers or players, require access to a networked system but do not have an associated user account. This can be particularly useful in situations where a user wants to grant access to their networked system to a guest device without requiring the guest to log in, present any form of credential, or create an account.

Authentication is a common process in networked systems to verify the identity of a user or a device. This process often involves the use of user credentials, such as a username and password, or device credentials, such as a device identifier and a corresponding pre-determined secret or certificate. Once authenticated, the user or device is typically issued a token, which can be used to authorize subsequent interactions with the system.

Various terms are used herein to describe the authentication of guest devices within a media playback system 100. As used herein, a "guest control device" comprises any control device 130 that is not associated with a user account for the media playback system 100. In some cases, the guest control device 130 may be associated with another media playback system 100 (e.g., a media playback systems 100 at their own home), but the guest control device 130 is not associated with a user account for the media playback system 100 of the LAN to which the guest control device 130 is currently connected. For example, a user may be visiting a friend's home, and the friend may have various playback devices 110 connected to the friend's LAN. The user may wish to control their friend's playback devices 110 even though the user does not have a user account associated with any of the playback devices 110 and is not logged in via the friend's user account.

Additionally, as used herein an "assertion" comprises a fact which an authorization client presents that it wishes to be considered when making authorization decisions. An "attestation" comprises an assertion accompanied by some trusted evidence that the facts asserted are true. For example, an assertion which has been validated and signed by a trusted cloud endpoint is an attestation to the statements contained in the assertion.

For the sake of example and explanation, within this disclosure various references are made of OAuth and PKI. While these references are provided for the sake of example and explanation, one of skill in the art will appreciate that these standards are not limiting the present invention to a particular protocol or standard. Instead, a wide variety of different standards and protocols may be used in conjunction with various embodiments disclosed herein. OAuth is a widely adopted open standard protocol for authorizing devices or applications to access a system on behalf of a user. In an OAuth flow, a client device or application requests access to a system, and if the user approves the request, the system issues an access token to the client. The client can then use this token to authenticate and authorize its interactions with the system. Relatedly, Public Key Infrastructure (PKI) is a set of roles, policies, hardware, software and procedures used to facilitate the secure electronic transfer of information for a range of network activities.

In at least one embodiment, a guest control device 130 comprises at least one processor; and at least one non-transitory computer-readable medium comprising program instructions that are executable by the at least one processor. The program instructions may cause the guest control device 130 to communicate, through a local area network to a first playback device 110, a self-signed authorization assertion. The guest control device 130 may then receive from the first playback device 110 a signed local-access token. The signed local-access token is signed by the first playback device 110 and allows the guest control device 130 to access services provided by playback devices 110 on the local area network. As will be appreciated in view of the disclosure herein, the signed local-access token may not be associated with a user account.

The guest control device 130 may also communicate to a cloud network (also referred to herein as "cloud network 102") a cloud authorization grant assertion. The cloud authorization grant assertion may comprise at least a portion of the signed local-access token. For example, the portion of the signed local-access token may comprise an identifier for the playback device, a token creation time, and/or a token expiration time. The identifier for the playback device can be used to indicate that the guest control device is physically present on the same local area network as the first playback device. For example, the cloud network 120 may verify that the identifier is associated with an authenticated playback device. Similarly, the cloud network 102 can use the token creation time and/or the token expiration time to verify that the signed local-access token is unexpired. The guest control device 130 may then receive from the cloud network 102 a cloud guest token. The cloud guest token is signed by the cloud network 102 and allows the guest control device to access services while connected on the LAN that are provided by the cloud network 102.

For example, in some embodiments, a guest control device 130 that is not associated with an authenticated user account may be provided with access to a playback device 110. This can be achieved by generating a device-level account that is not linked to a personal identity and may be linked to a particular device or temporary account. The device-level account can be authenticated using device certificates, which serve as a form of digital identification for the device. The device certificates can be issued by a parallel public-key infrastructure (PKI) specifically designed for authenticating non-player device identity. This parallel PKI may have a relaxed protocol for issuing certificates compared to players, allowing for a more streamlined process of device authentication.

In some embodiments, playback devices 110 may be configured to become issuing authorities (e.g., OAuth issuing authorities) for their households. This means that a playback device 110 can accept a self-signed authorization assertion from a guest control device 130 and produce an authorization token that is valid for guest access to various media playback system 100 APIs. The self-signed authorization assertion is a form of credential that the guest control device 130 presents to a playback device 110, and the playback device 110, in turn, generates an signed local-access token that grants the guest control device 130 access to the media playback system 100.

Additionally, in some embodiments, a guest control device 130 can communicate a cloud authorization grant assertion to a cloud network 102. The cloud network 102 may then issue a cloud guest token for accessing cloud services. In order to obtain the cloud guest token, the cloud authorization grant assertion may be required to comprise an access token from a playback device 110 and to be signed by a valid device certificate held by the guest control device 130. The access token from the playback device 110 can serve as an attestation that the guest control device 130 is physically present on the same LAN as the playback device 110. This ensures that the guest control device 130 has the appropriate permissions to access the cloud services associated with the media playback system 100.

Figure 7:
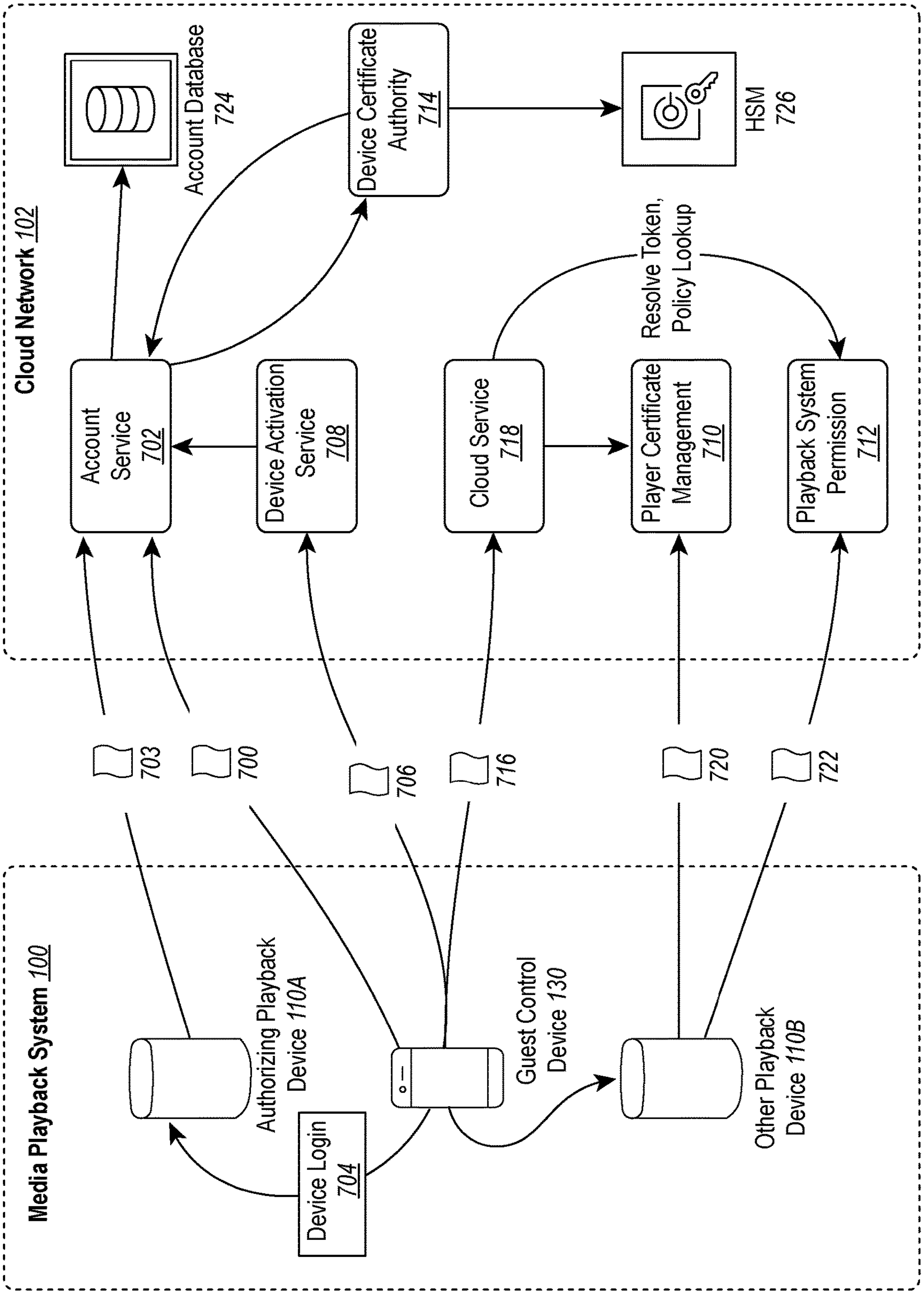
FIG. 7 is a schematic diagram of a system for authenticating guest devices.

FIG. 7 is a schematic diagram of a system for authenticating guest devices. While not required for embodiments of the present invention, the depicted system is in communication with a cloud network 102. A general overview of the process for authenticating a device-level account for a guest control device 130 will be provided with respect to FIG. 7. Many of the steps below will also be described in greater details within subsequent figures.

In the depicted embodiment, the guest control device 130 sends a communication 700 registering itself with an account services API 702 in the cloud network 102. The account services API 702 can communicate with a device certificate authority 714 to request device certificates. The device certificate authority 714 may communicate with a hardware security module (HSM) 726 in order to manage and/or generate device certificates. As part of the registration process, the account services API 702 may provide to the guest control device 130 a device certificate. The device certificate provides a means for the media playback system 100 and the cloud network 102 to identify and authenticate a guest control device 130.

In some embodiments, the guest control device 130 may register with the account services API 702 prior to joining the media playback system 100 as a guest. For example, the guest control device 130 may download a purpose-made application for controlling playback devices 110 within a media playback system 100. During the installation of the application, the guest control device 130 may register within the account services API 702. The account services API 702 may store device account information and associated certificates within an account database 724.

After connecting to the media playback system 100, the guest control device 130 can send a self-signed authorization assertion 704 to authenticate with an authorizing playback device 110A. The self-signed authorization assertion 704 may be signed using the device certificate provided by the account services API 702. The authorizing playback device 110A may communicate 703 within the account service API 702 to validate the device certificate signature. If the account service API 702 indicates that the device certificate is valid, the authorizing playback device 110A can provide a signed local-access token to the guest control device 130. Using the signed local-access token, the guest control device 130 can issue commands to other playback devices 110B present within the media playback system 100. The playback devices 110 are configured to accept commands that are authenticated by signed local-access tokens.

The guest control device 130 can also send a cloud authorization grant assertion 706 to a device authorization service 708 located in the cloud network 102. The authentication request 706 may comprise at least a portion of the signed local-access token and may be signed using the device certificate that the guest control device 130 received from the account services API 702. After receiving the authentication request 706, the device authorization service 708 can validate the device certificate associated with the guest control device 130 using the account service API 702. If the device certificate is valid, the device authorization service 708 provides a cloud guest token to the guest control device 130.

Using the cloud guest token, the guest control device 130 may be allowed to make limited calls 716 to cloud services 718 that can then cause actions to be implemented by playback devices 110 within the media playback system 100 or information sent to the guest control device 130. In at least one embodiment, prior to accepting commands from a guest control device 130, the cloud services 718 are configured to validate device certificates against a player certificate management service 710 and to validate and/or resolve token permissions with a playback system permission service 712. In at least one embodiment, the playback devices 110 may also, or instead, be configured such that prior to accepting commands from a guest control device 130, the playback devices 110 communicate 720, 722 with the cloud network 102 to validate device certificates with the player certificate management service 710 and to validate and/or resolve token permissions with the playback system permission service 712.

a. Identifying Media Playback Systems and Devices

In some embodiments, various systems can be used to identify specific media playback systems 100, playback devices 110, and/or control devices 130. For example, in at least one embodiment, a system identification (system ID) is used that identifies a set of playback devices 110 that share the same registered owner, are on the same local network, and share a trust relationship (i.e. can share content and can be grouped). As used herein, a playback media system 100 comprises a single system ID.

In at least one embodiment, the system ID comprises a tuple of an owner identifier, household identifier, and a network hash. The owner identifier may comprise an authenticated user ID (e.g., OAuth user ID). The network hash may comprise a unique value calculated by a playback device 110 using characteristics of the LAN. The household identifier may comprise an identifier for any media playback system associated with the same registered owner and are thus part of the same household. In at least one embodiment, multiple system IDs may be associated with a single household identifier. For example, a system ID may be associated with a particular media playback system 100 on a user's home Wi-Fi. Additionally, the user may have a second media playback system 100 active on the user's work Wi-Fi. In such a case, the household identifier is associated with both the user's home media playback system 100 and the user's work media playback system 100. When comparing two system IDs, the cloud network 102 determines the two system IDs are equivalent if their network hashes and owner identifiers are identical. An example of a system ID in the form of a JSON object, may comprise the following: {"owner": {"luid": 123456789, "auid": "1a2b3c4d6e" }, "hhid": "ID_ed4kQrw90asdf8a0asfd0", "network_hash": "FE45a07813E" }.

In at least one embodiment, devices are uniquely identified via an RFC9039 device URN of type "ops". An example device identifier may comprise a URN in the following format: urn:dev:ops:PEN-CLASS-SERIAL:IDENTIFIER, where: PEN is the manufacturer's IANA Private Enterprise Number, CLASS is the product class as defined by the manufacturer, SERIAL is the manufacturer's serial number for the device, and IDENTIFIER is reserved for application-specific use and can be an arbitrary number of tokens.

b. Playback Device Relative Time

Many secure ticket-based security protocols, such as Kerberos, SAML, or OAuth, rely upon the ability of issuing authorities and service providers to agree on a common source of truth for the current time. This current time may be used to create a token creation time and/or a token expiration time. This common agreement on the current time is used to ensure that tokens expire and require renewal at the correct times. In at least one embodiment, playback devices 110 may lack a real time clock and/or may be without access to an external clock source via the internet for extended periods of time (e.g., rural homes) or deliberately set up without internet access (e.g., retail displays). Due to the absence of a common agreement on the current time, disclosed embodiments are able to establish a common source of truth for token creation times and token expiration times without resorting to the playback device 110 connecting to an external clock (e.g., a network clock).

Some embodiments may utilize a "player relative time" in order to properly manage the expiration of tokens. For example, when a playback device 110 boots up, it can generate a relative time identifier to distinguish timestamps issued during this period of activity from others in the past or future. This "relative time identifier" is also referred to herein as the "epochId" since it establishes an epoch for timestamps relative to its creation. The playback device 110 stores the epochId in memory and is not persisted between restarts. A relative timestamp comprises the epochId and an integer representing the number of seconds since the previous startup. The use of the previous startup to initiate the timer and create the epochId is only exemplary and one will appreciate that any number of different events can be used to generate a new epochID and timer. For example, exiting a sleep state, playing a song, changing a volume, skipping a song, muting, or any number of other actions may cause the playback device 110 to generate an epochID and start a new timer. As such, in at least one embodiment, at least the token expiration time comprises a network device relative time that is derived independent of an external time source. Additionally, the network device relative time may comprise a first unique relative time identifier and a first relative time indicator that increments or decrements from a pre-determined event.

For example, on startup a playback device 110 might generate an epochId of 123456ABCDE. Its advertised relative time would then start at 123456ABCDE:1 at T+1 seconds and increment from there. When the playback device 110 is restarted, it can generate a new epochId and timestamps would resume counting up from 0 seconds. Each playback device 110 can advertise its current relative timestamp via a LAN accessible API command. When a service provider, such as another playback device 110, receives a relative timestamp in a token, it can compare the token creation time and the token expiration time to the issuing playback device's current relative time by fetching the current relative time from the issuing playback device 110. If the epochId of the retrieved relative time does not match the epochId of the token creation time and/or the token expiration time under consideration, then the playback device 110 has rebooted since the timestamp was issued and the timestamp cannot be validated. The token should not be accepted, and the guest control device 130 must re-authenticate.

As an example of the player relative time, in at least one embodiment, a guest control device 130 may authenticate to a playback device 110*a* that is associated with a serial number of 486R98D570A4. In response, the guest control device 130 may receive a signed local-access token that comprises a playback device identifier, a token creation time (i.e., a relative time stamp), and/or a relative time expiration (i.e., a token expiration time). The resulting token may take the following form:

(urn:dev:ops:4497448A6066, 1E72AD5D54D:300, 1E72AD5D54D:3900).

In this example, the token was issued at T+300 seconds (5 minutes) after the playback device 110 started and will expire at T+3900 seconds (65 minutes) after the playback device 110 started. As such, the token is valid for a total of one hour. In some embodiments, the token may not comprise a token creation time.

Continuing this example, the guest control device 130 may communicate to another playback device 110*b*, through the LAN, a local command that is configured to cause the other playback device 110*b* to perform a function. The local command comprises the signed local-access token as the authenticator. The signed local-access token may comprise the following expiration claims (urn:dev:ops:4497448A6066, 1E72AD5D54D:300, 1E72AD5D54D:3900).

After receiving the signed local-access token, the other playback device 110*b* identifies the first playback device 110*a* identifier (e.g., 4497448A6066) within the signed local-access token. The other playback device 110*b* then calls a LAN accessible API command for relative time from the first playback device 110*a* with serial number 4497448A6066. Specifically, the other playback device 110*b* communicates to the first playback device 110*a* a request for a relative time identifier and a relative time indicator from the first playback device 110*a*. In response, the LAN accessible API command may indicate that the current relative time for 4497448A6066 is 1E72AD5D54D:1800. The other playback device 110*b* then compares the relative time identifier and the token expiration time from the signed local-access token with the relative time identifier and the relative time indicator provided by the API command. Since the epochId of the current relative time matches the epochId of the timestamp in the signed local-access token, the receiving playback device 110 can compare the integer timestamp values and since 300<1800<3900, the signed local-access token is not expired. One will appreciate that in contrast, when the first unique relative time identifier indicates that the token expiration time has lapsed, the guest control device 130 will reject the local command.

As yet another example, the other playback device 110*b* within the media playback system 100 may receive a request from the guest control device 130 with the signed local-access token as the authenticator. The signed local-access token may comprise the following expiration claims (urn:dev:ops:4497448A6066, 1E72AD5D54D:300, 1E72AD5D54D:3900). The other playback device 110*b* may then call the LAN accessible API command for relative time from the first playback device 110*a* with serial number 4497448A6066. In response, the LAN accessible API command indicates that the current relative time for 4497448A6066 is 83DFA489C98:600. Since the epochId of the current relative time does not match the epochId of the timestamp in the signed local-access token, the age of the signed local-access token is uncertain. As such, when the first unique relative time identifier (e.g., epochID of the current relative time) and the second unique relative time identifier (e.g., epochId of the token) fail to match, the other playback device 110*b* rejects the local command and the guest control device 130 will need to reauthenticate.

c. Registering Guest Control Device Accounts

Figure 8:
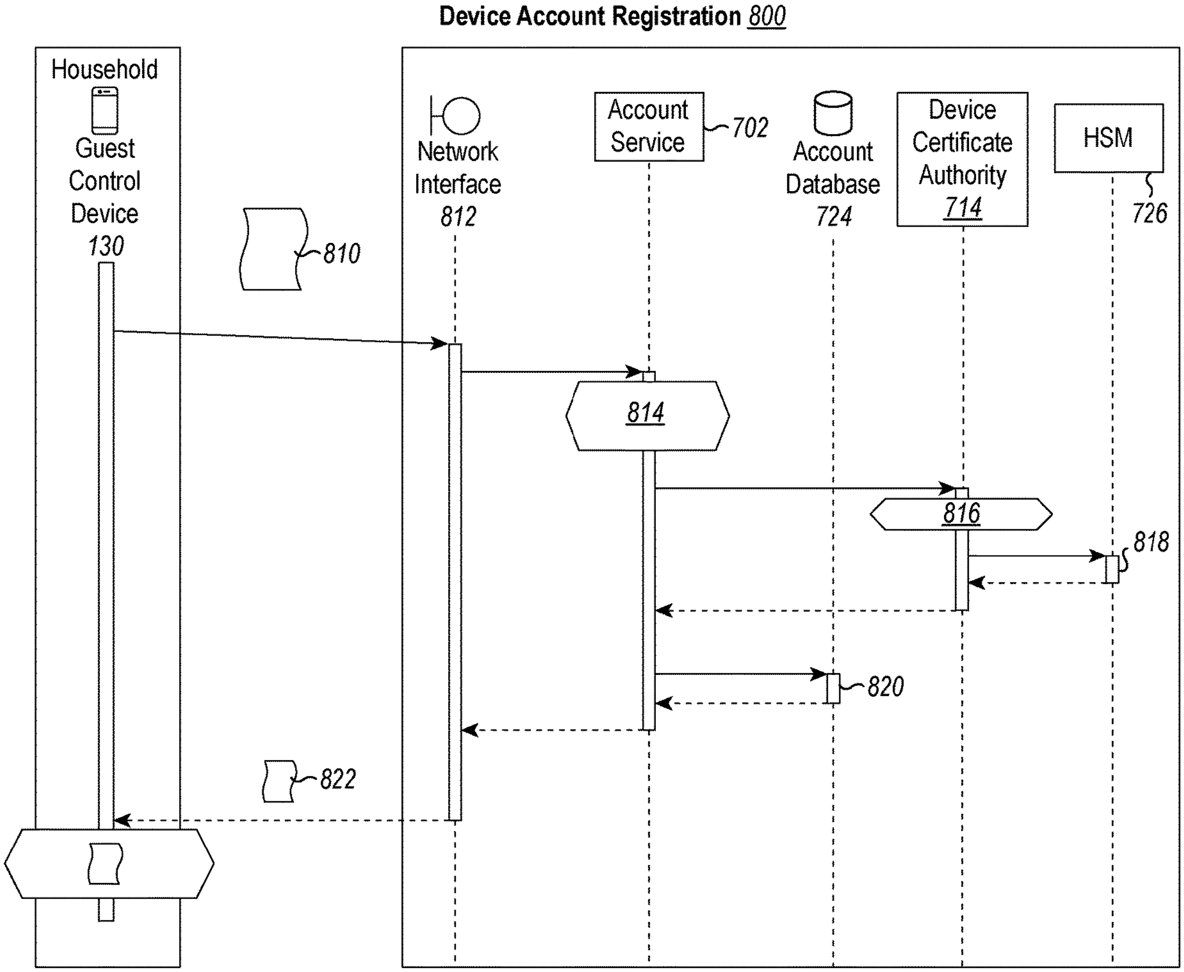
FIG. 8 is a message flow diagram for authenticating guest devices.

In some embodiments, a guest control device 130 which has not previously interacted with the media playback system 100 and/or a cloud network 102 must first register a device account with the account service API 702. FIG. 8 illustrates a flow diagram for registering guest control devices 130. A guest control device 130 can register itself by sending a registration request 810 to a device account registration service 800. In at least one embodiment, the device account registration service 800 is hosted by the cloud network 102 and accessible through cloud network interface 812. Cloud network interface 812 can manage and route access to cloud services and translate data in tokens to be digestible by the target cloud service.

The registration request 810 may include a call to the account service API 702. At block 814, the account service API 702 can generate a random device UUID device ID, RSA private key, device secret, and create a device account record. The account service API 702 can then generate a CSR (certificate signing request) for a new device certificate to be issued to the guest control device 130. At block 816, the CSR is submitted to the device certificate authority 714, which will generate a certificate and, in block 818, send it to the HSM for signing. Once the account services API 702 has received the signed certificate back from the device certificate authority 714, at least a portion of the registration information can be saved within the account database 724 (shown in block 820).

The account service API 702 then returns a response 822 containing one or more of the guest control device certificate and associated private key, a guest control device identifier, and/or a guest control device secret, which may be used in the future to renew the certificate. The guest control device 130 can then securely store the device secret and the private key. If a private key or secret is lost by the guest control device 130, then the guest control device 130 can simply re-register as described above and receive a new private key and secret. In at least one embodiment, it is not necessary for playback devices 110 to register because the playback devices 110 may already have a device secret in the form of a hardware-based secure registration private key that was created during the manufacturing process.

d. Authenticating Guest Control Device Accounts to LAN

As explained above, in some embodiments, rather than using a password in order to initiate a login, a guest control device 130 can generate a self-signed authorization assertion 704 and perform a client authorization assertion grant as described in RFC 7521 § 6.3.1. An example format of and type of the self-signed authorization assertion 704 is a self-signed JWT as described in RFC7523 § 2.1. The claims in the authorization grant may include one or more of the following: a globally unique opaque identifier, a device identifier, a URL of the authorization the assertion will be presented to, a timestamp for when the assertion was created, a timestamp for when assertion expires, and/or a system ID. In cases where an external time source is not available, the authorization grant may include a current player relative time of the player being authenticated to and an expiration time based upon the player relative time.

Figure 9:
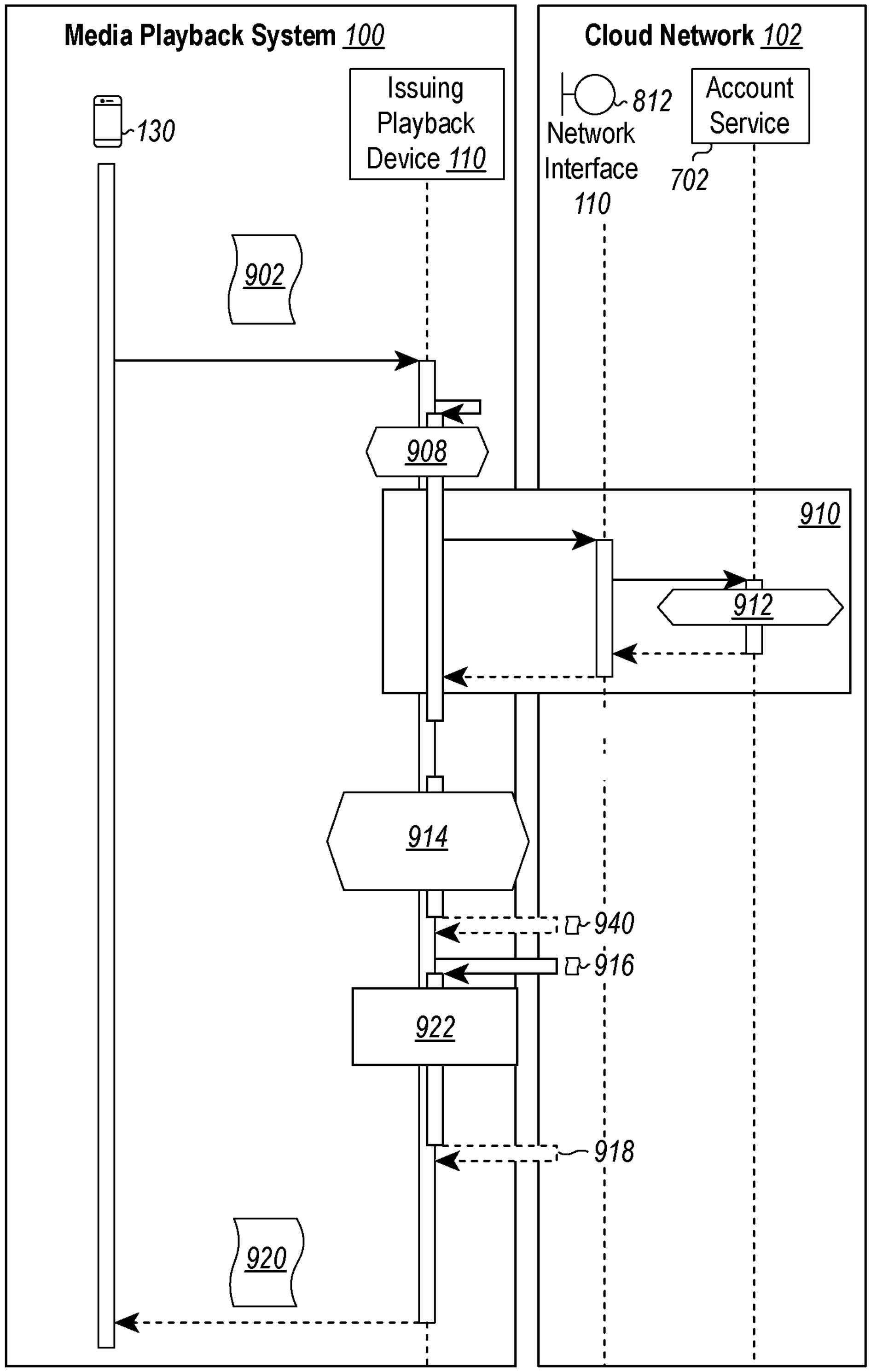
FIG. 9 is another message flow diagram for authenticating guest devices.

FIG. 9 illustrates a flow diagram for authenticating a guest control device 130 with a playback device 110. In at least one embodiment, the signed local-access token described herein comprises a JWT issued by a playback device 110 which authorizes a guest control device 130 to access the subset of playback devices 110 on a single LAN segment which the issuing playback device 110 is a member of. This signed local-access token can be used to issue media playback system 100 commands to playback devices 110 on the LAN. The signed local-access token may not be useable, on its own, with the cloud network 102.

In at least one embodiment, the guest control device 130 selects a playback device 110 to authenticate to. The guest control device 130 prepares a communication by requesting a current time. The current time may be provided by a network resource, may be provided by the guest control device 130, and/or may comprise a player relative time. The guest control device 130 creates a self-signed authorization assertion 704 containing its device ID, current time, and the system ID of the target system. In at least one embodiment, including the authenticating playback device's relative time limits the time scope of the assertion and prevents replay attacks. In communication 902, the self-signed authorization assertion 704 is presented to a playback device 110 on the target system. In at least one embodiment, the self-signed authorization assertion 704 is presented as an RFC7523 § 2.1 jwt-bearer authorization grant.

In block 908, the playback device 110 can validate the signature of the self-signed authorization assertion 704 using the root guest device certificate it has already cached in its trust store. Optionally in segment 910, if the playback device 110 has a connection to the cloud network 102 it can optionally reach back to account service 702. In block 912, the account service 702 can check the validity of the guest device certificate.

In block 914, the playback device 110 can check the configuration of its household to ensure that it is in a configuration to allow anonymous guest device access. If so, in block 922, the playback device 110 generates, signs, and returns a signed local-access token. In at least one embodiment, the signed local-access token comprises an OAuth JWT access token. In communication 920, the playback device 110 provides the signed local-access token to the guest control device 130.

In at least one embodiment, the signed local-access token is signed by the playback device's secure registration certificate. The signed local-access token may attest to one or more of the following claims a globally unique and opaque identifier, the identity of the player issuing the token, a device URN identifying the issuing player, the identity of the device that is to be granted access, an audience restriction, a system id where the signed local-access token is valid, a time when the signed local-access token was issued, a time when the signed local-access token expires, and/or the scopes authorized by the signed local-access token.

Figure 10:
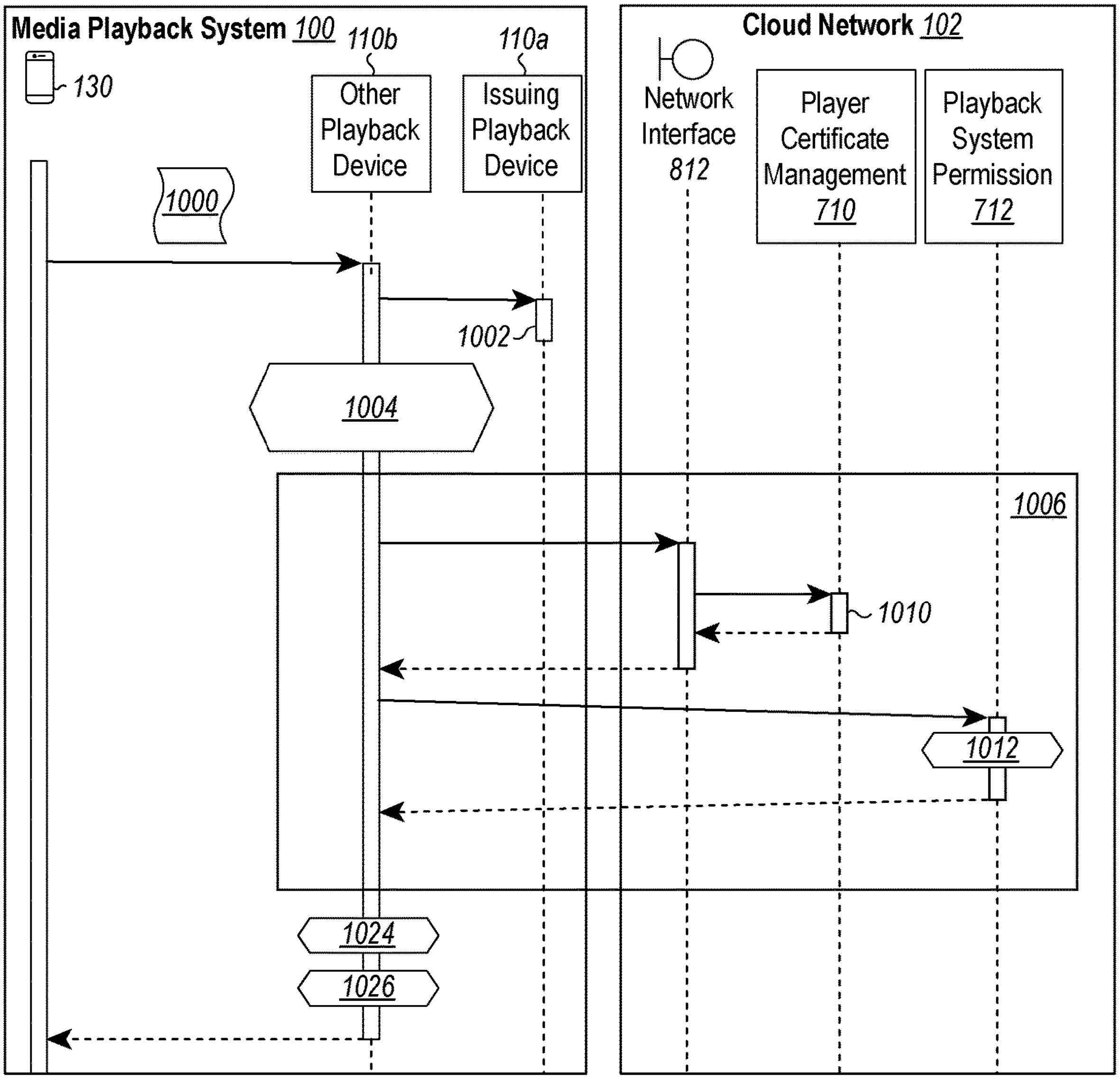
FIG. 10 is another message flow diagram for authenticating guest devices.

FIG. 10 illustrates a flow diagram for using a signed local-access token within a LAN. In at least one embodiment, a guest control device 130 uses a signed local-access token by presenting signed local-access token when making a API call 1000 to a playback device 110*b* on the same LAN as the issuing playback device 110*a*. Playback device-issued signed local-access token may only be valid when presented to other playback devices 110 with the same owner, Household ID, and network hash as the issuing player.

In box 1004, the receiving playback device 110*b* verifies one or more of the following: that the signing certificate is issued by a trusted authority and is not expired, that the signature is valid, and that the system ID claim in the signed local-access token matches the system ID of the current playback device 110*b*. Box 1002 depicts the playback device 110*b* fetching the current relative player time of the issuing playback device 110*a* by accessing the issuing playback device 110*a*.

In some embodiments, if the issuing playback device 110*a* cannot be reached, then the signed local-access token cannot be validated and access should be denied. Similarly, if the epochID from the issuing playback device 110*a* does not match the epochID in the timestamp of the signed local-access token, then access should be denied. Additionally, the playback device 110*b* can compare the relative time expiration in the signed local-access token to the current relative time on the issuing playback device 110*a* and ensure the signed local-access token is not expired.

In segment 1006, if a connection to the cloud network 102 is available, the playback device 110*b* can check with the player certificate management service 710 to ensure the signing certificate that validates the signed local-access token has not been revoked (shown in box 1010). Once the signed local-access token is validated, the playback device 110*b* can authorize the requested action by contacting the playback system permissions 712 and fetching the appropriate policy to apply to guest devices (shown in box 1012). In box 1024, if no cloud connection is available to fetch the current policy from the playback system permissions 712, a default guest policy may be used. In box 1026, the requested API call 1000 is executed on playback device 110*b*.

e. Authenticating Guest Control Device Accounts to Cloud Server

As discussed above, there may be a select set of cloud network APIs that are accessible by a guest control device 130 on a LAN. For example, cloud network APIs may provide a guest control device 130 with information such as music search, music history, etc. In some embodiments, these are APIs mainly concerned with finding content to play back. For example, the guest control device 130 can call the API to request the desired information. As describe above, to provide access to these cloud network APIs a separate trust anchor in the cloud network 102 can issue cloud guest token to the guest control device 130 and gate access to cloud network APIs. Obtaining one of these cloud guest token may require both a valid guest device credential as well as a signed local-access token from a playback device 110 as an attestation that the guest control device 130 is physically present on the same LAN as the playback device 110.

Figure 11:
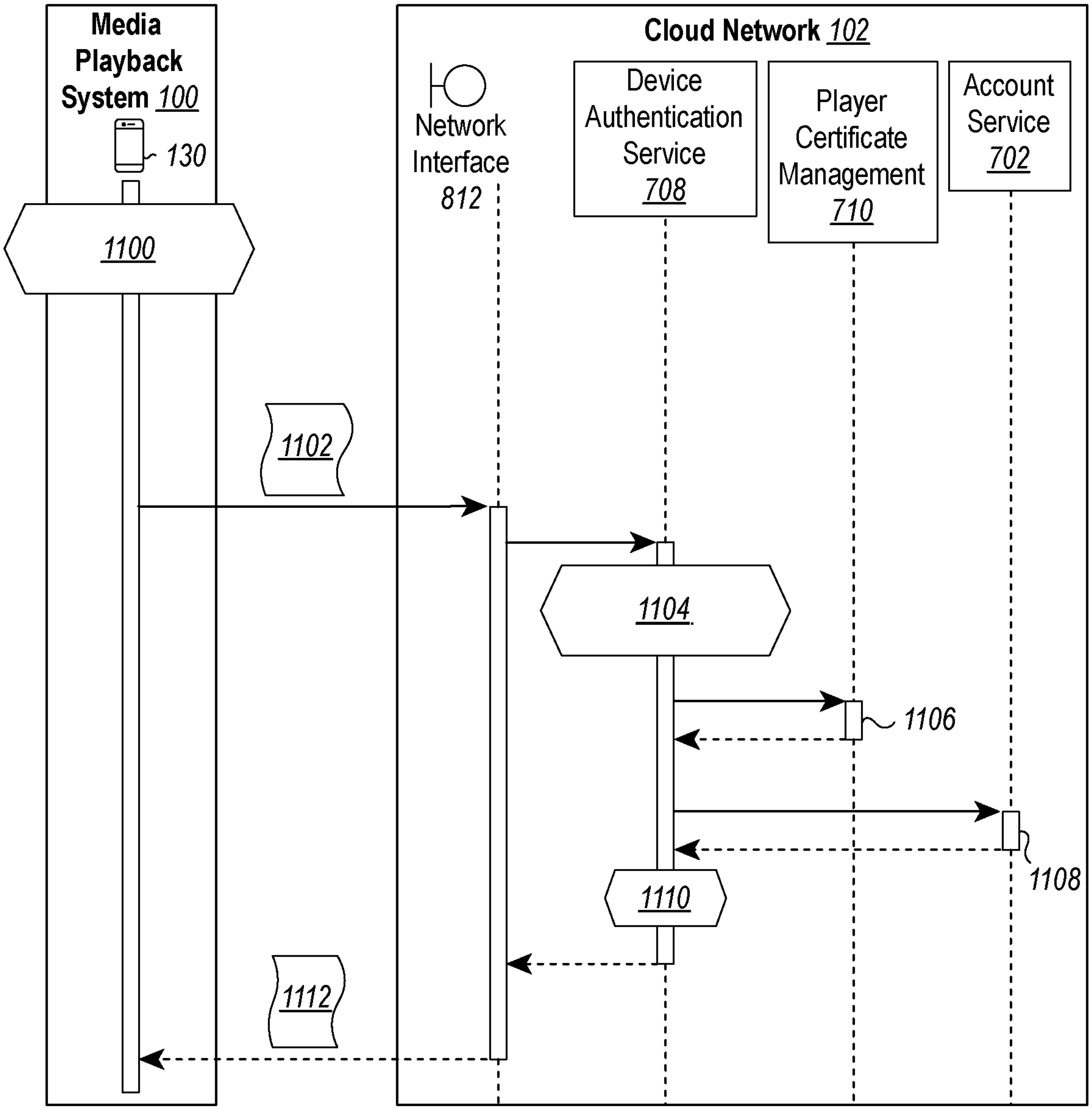
FIG. 11 is another message flow diagram for authenticating guest devices.

FIG. 11 illustrates a flow diagram for obtaining a cloud token. To obtain the cloud access token, in box 1100, the guest control device 130 generates a cloud authorization grant assertion. The cloud authorization grant assertion may comprise the player-issued LAN access token as a claim in the assertion. The cloud authorization grant assertion may also comprise a signature associated with the guest control device. In communication 1102, the guest control device 130 communicates the cloud authorization grant assertion to the cloud network interface 812 of the cloud network 102.

In box 1104, the device authentication service 708 examines the cloud authorization grant assertion to validate the signature provided by the guest control device 130 and to also validate that attached player-issued LAN access token. This validation of the guest control device 130 is accomplished by performing one or more of the following: validating the guest control device certificate using the player certificate management service 710 (shown in box 1106), validating the guest control device signature, and/or validating the timestamp and expiration claims.

If the above guest control device 130 is validated, the cloud authorization grant assertion can proceed to validate the player-issued LAN access token. In order to validate the player-issued LAN access token, the device authentication service 708 may utilize information (shown in box 1106) provided within the player certificate management service 710 and/or information (shown in box 1108) provided by the account service API 702. Using this information, the device authentication service 708 can validate the playback guest device signature using the public key from the certificate, validate the current timestamp indicates the player-issued LAN access token is not expired, and validate that the system id claim matches the media playback system 100 as identified by the various LAN attributes in the player certificate. If all of the above validate, then the login request is granted and a cloud guest token is issued. This cloud guest token can be recognized by a set of cloud network APIs used for functionality of the guest control device user experience. Those services may include music account search, some read-only access to some basic household settings, and various other services (e.g., access to music services and/or voice assistant services). In order to provide narrow access to only to desired features, the cloud network 102 may add some tightly defined scopes that cover only those resources.

Figure 12:
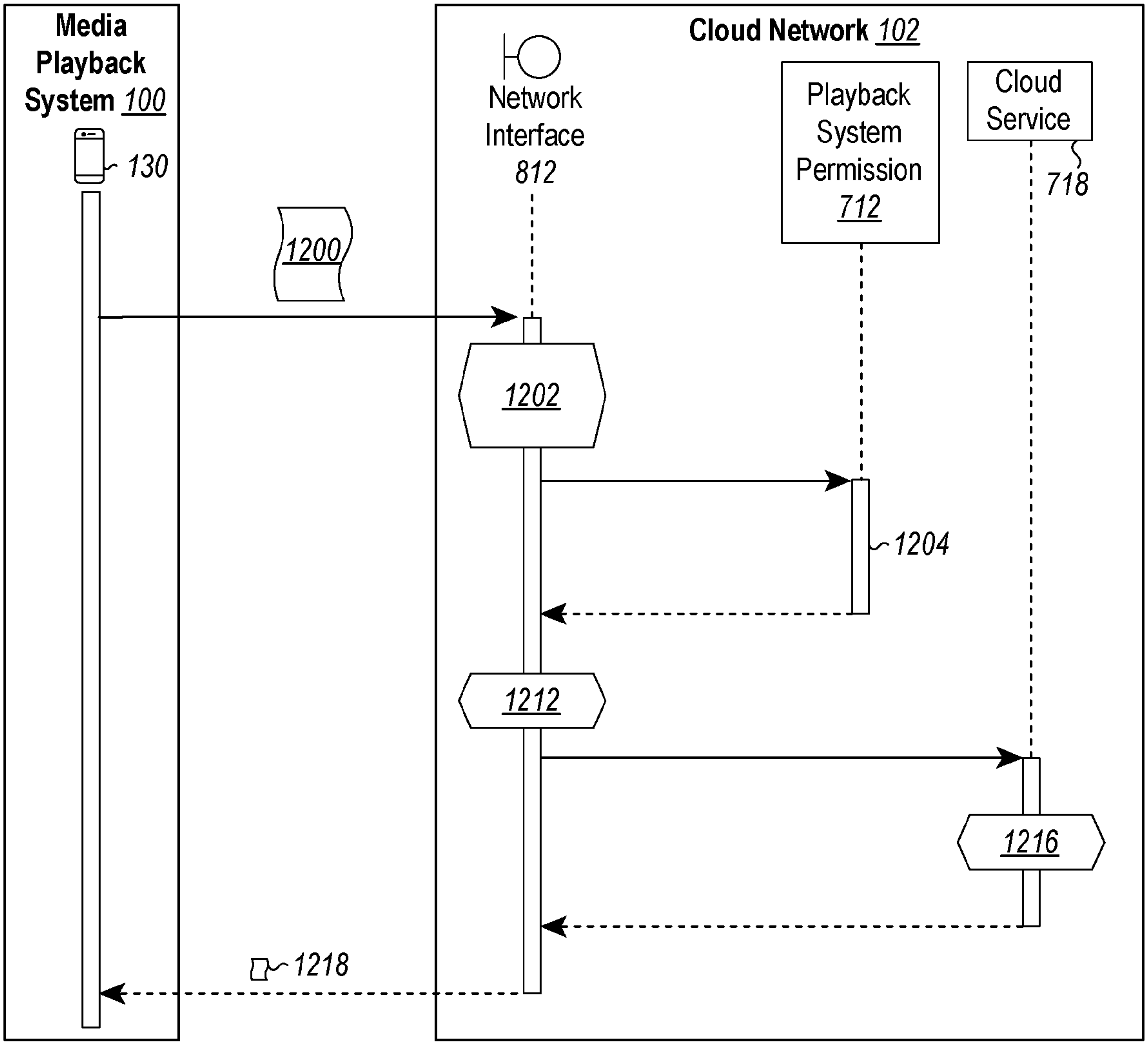
FIG. 12 is another message flow diagram for authenticating guest devices.

FIG. 12 illustrates a flow diagram for using a cloud token to call a cloud network API. In at least one embodiment, the guest control device 130 communicates to the cloud network 102 a cloud command that is configured to cause the cloud network 102 to cause a function to be performed at the guest control device 130 or at the playback device 110. When making a cloud command 1200 to a cloud service, the cloud command 1200 can comprise the cloud guest token as a bearer token in the authorization header. As part of processing the request, the cloud network interface 812 in box 1202 can consume the token and extract the pertinent information for the cloud service. The cloud network interface 812 can also resolve the token's permissions with the playback system permission service 712 (shown in box 1204). The cloud network interface 812 can request permissions from the playback system permission service 712, and the playback system permission service 712 can return a policy assigned to the token. The policy provides services, settings, and APIs that the device associated with the token is authorized to access. In at least one embodiment, the cloud network interface 812 can translate the data in the cloud guest token into a security header that the target service understands. In box 1212, this can be accomplished by extracting the owner id claim from the cloud guest token and presenting it, in box 1216 to the cloud service 718, as a requesting user ID. After determining that the cloud guest token has not expired, the cloud network 102 can cause the cloud command 1200 to execute. For example, in some embodiments, the cloud service 718 may communicate service data 1218 back to the guest control device 130 for display.

f. Authenticating Playback Devices

The protocol outlined herein also can provide a mechanism for issuing tokens to playback devices 110 using many of the same systems and methods described herein with respect to guest control devices 130. For example, a playback device could present a cloud playback device token issued by the device authorization service 708. In at least one example, playback device 110*a* generates a player-signed device authorization token as described above with the various identifying information pointing to the playback device 110*a* itself. The playback device 110*a* presents the player-signed device authorization token as a bearer access grant to the account service 702. The device authorization service 708 validates the player-signed device authorization token signature as well as validating the player certificate used to sign the token. The playback device 110 then receives a cloud playback device token which it can use to call cloud APIs without establishing a mutual SSL connection. The cloud network interface 812 can translate the cloud playback device token into a backend call that has the playback device's owner as the security context.

g. Flow Diagrams

Figure 13:
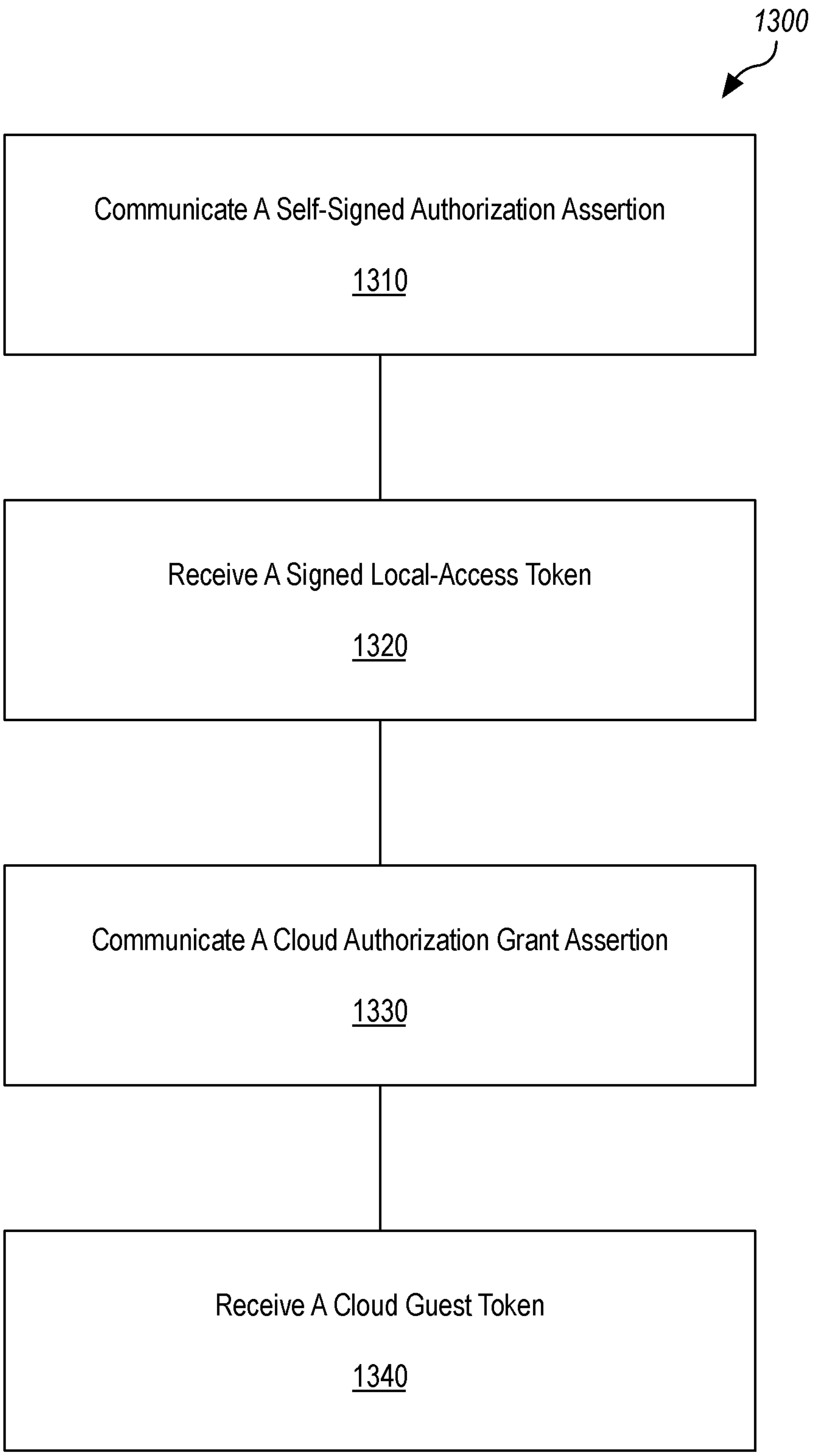
FIG. 13 is a flow diagram for authenticating guest devices.

FIG. 13 depicts a flow diagram for authenticating guest devices. The flow diagram of FIG. 13 corresponds with a method 1300 for authenticating a guest control device. The method 1300 comprises an act 1310 of communicating a self-signed authorization assertion. Act 1310 includes communicating, through a local area network to a first playback device, a self-signed authorization assertion. For example, FIG. 7 and the associated description show the guest control device 130 sending a self-signed authorization assertion 704 to a playback device 110*a*.

Additionally, method 1300 may comprise an act 1320 of receiving a signed local-access token. Act 1320 includes receiving, from the first playback device, a signed local-access token, wherein the signed local-access token is signed by the first playback device and allows the guest control device to access services via playback devices on the local area network. For example, FIG. 7 and the associated description describe the guest control device 130 receiving a signed local-access token from the playback device 110*a*.

Method 1300 may also comprise an act 1330 of communicating a cloud authorization grant assertion. Act 1330 includes communicating, to a cloud network, a cloud authorization grant assertion. The cloud authorization grant assertion may comprise at least a portion of the signed local-access token, wherein the at least the portion of the signed local-access token comprises an identifier for the first playback device. For example, FIG. 11 and the associated description describe a cloud authorization grant assertion being generated in box 1100 and in box 1102 communicated to the cloud network 102.

In addition, method 1300 comprises an act 1340 of receiving a cloud guest token. Act 1340 includes receiving, from the cloud network, a cloud guest token, wherein the cloud guest token is signed by the cloud network and allows the guest control device to access cloud-based services associated with the playback devices on the local area network. For example, FIG. 11 and the associated description describe a cloud guest token being issued to the guest control device 130.

Figure 14:
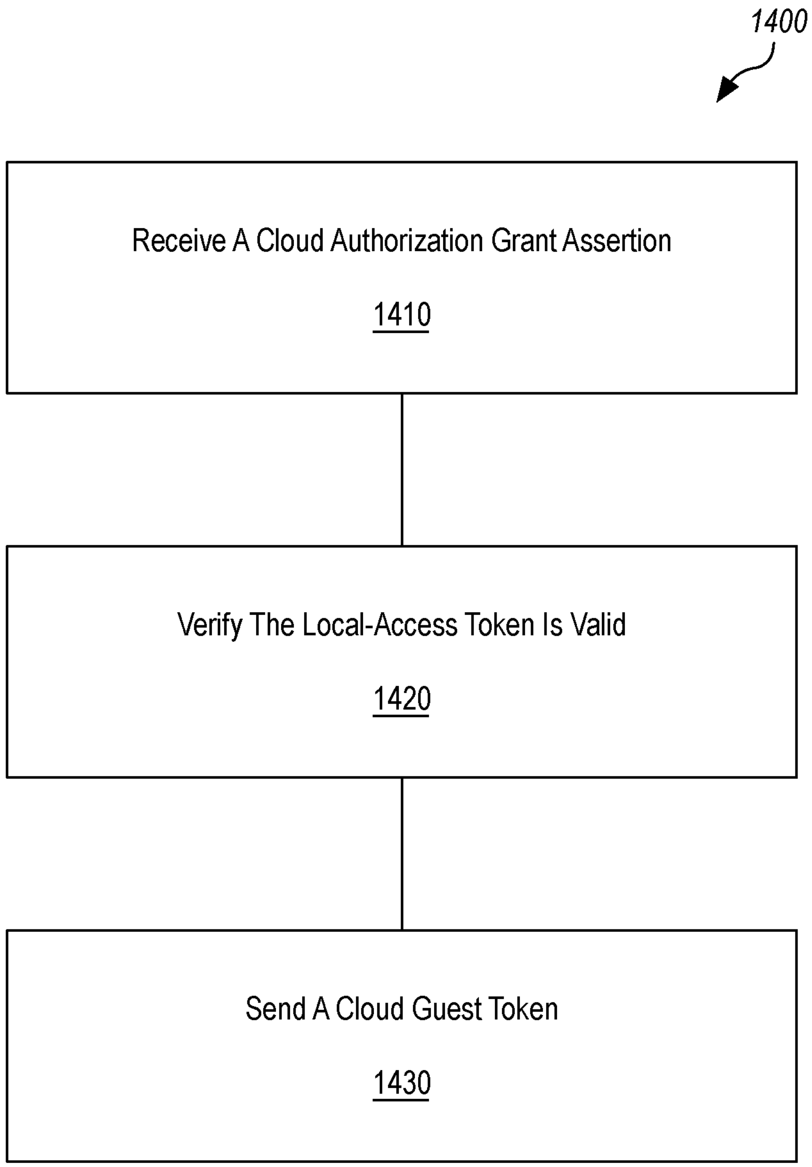
FIG. 14 is another flow diagram for authenticating guest devices.

FIG. 14 illustrates another flow diagram for authenticating guest devices. The flow diagram of FIG. 14 corresponds with a method 1400 for authenticating a guest control device. Method 1400 comprises an act 1410 of receiving a cloud authorization grant assertion. Act 1410 includes receiving, at the cloud network, a cloud authorization grant assertion from a guest control device. The cloud authorization grant assertion may comprise at least a portion of a signed local-access token. The signed local-access token may have been generated in response to a self-signed authorization assertion sent from the guest control device to a first playback device on a local area network shared by the guest control device. Additionally, the signed local-access token may be signed by the first playback device and allow the guest control device to access services via playback devices on the local area network. At least the portion of the signed local-access token comprises an identifier for the first playback device. For example, FIG. 11 and the associated description describe a cloud authorization grant assertion being received by the cloud network 102 in communication 1102.

Additionally, method 1400 includes an act 1420 of verifying the signed local-access token is valid. For example, FIG. 11 and the associated description describe a cloud authorization grant assertion being processed by the cloud network 102 in boxes 1104, 1106, 1108, and 1110.

Method 1400 also includes an act 1430 of sending a cloud guest token. Act 1430 comprises sending, to the guest control device, a cloud guest token. The cloud guest token may be signed by the cloud network and allow the guest control device to access cloud-based services associated with the playback devices on the local area network. For example, FIG. 11 and the associated description describe a cloud guest token being issued to the guest control device 130.

IV. Features of the Invention

The disclosed technology is illustrated, for example, according to various features described below. Various examples of features of the disclosed technology are described as numbered features (1, 2, 3, etc.) for convenience. These are provided as examples and do not limit the disclosed technology. It is noted that any of the dependent features may be combined in any combination, and placed into a respective independent features. The other features can be presented in a similar manner.

Feature 1. A guest control device comprising: at least one processor; and at least one non-transitory computer-readable medium comprising program instructions that are executable by the at least one processor such that the guest control device is configured to: communicate, through a local area network to a media playback system comprising a first playback device, a self-signed authorization assertion; receive, from the first playback device, a signed local-access token, wherein the signed local-access token is signed by the first playback device and allows the guest control device to access services via playback devices on the local area network; communicate, to a cloud network, a cloud authorization grant assertion, wherein the cloud authorization grant assertion comprises: at least a portion of the signed local-access token, wherein the at least the portion of the signed local-access token comprises an identifier for the first playback device; and receive, from the cloud network, a cloud guest token, wherein the cloud guest token is signed by the cloud network and allows the guest control device to access cloud-based services associated with the playback devices on the local area network.

Feature 2. The guest control device as recited in feature 1, wherein the cloud authorization grant assertion comprises a signature associated with the guest control device.

Feature 3. The guest control device as recited in feature 2, wherein the identifier for the first playback device is relied upon to indicate that the guest control device is physically present on the same local area network as the first playback device.

Feature 4. The guest control device as recited in one of features 1 to 3, wherein the signed local-access token comprises a first playback device identifier and a token expiration time.

Feature 5. The guest control device as recited in feature 4, wherein at least the token expiration time relies upon a network device relative time that is derived independent of an external time source, the network device relative time further comprising: a first unique relative time identifier, and a first relative time indicator that increments or decrements from a pre-determined event.

Feature 6. The guest control device as recited in feature 5, wherein the at least one non-transitory computer-readable medium further comprises program instructions that are executable by the at least one processor such that the guest control device is configured to: communicate to a second playback device, through the local area network, a local command that is configured to cause the second playback device to perform a function, wherein the local command comprises the signed local-access token; identify, at the second playback device, the first playback device identifier within the signed local-access token; communicate, from the second playback device to the first playback device, a request for a second unique relative time identifier and a second relative time indicator; and compare the first unique relative time identifier and the token expiration time within the signed local-access token with the second unique relative time identifier and the second relative time indicator.

Feature 7. The guest control device as recited in feature 6, when the first unique relative time identifier indicates that the token expiration time has lapsed, reject the local command.

Feature 8. The guest control device as recited in feature 6, wherein, when the first relative time indicator and the second relative time indicator fail to match, the guest control devices is configured to reject the local command.

Feature 9. The guest control device as recited in feature 4 alone or in combination with any other feature, wherein the at least one non-transitory computer-readable medium further comprises program instructions that are executable by the at least one processor such that the guest control device is configured to: communicate, to the cloud network, a cloud command that is configured to cause the cloud network to provide information to be displayed at the guest control device or at the first playback device, wherein the cloud command comprises the cloud guest token; identify, at the cloud network, the first playback device identifier within the cloud guest token; and after determining that the cloud guest token has not expired, display the information at the guest control device.

Feature 10. The guest control device as recited in any preceding feature, wherein the local area network comprises a personal area network.

Feature 11. The guest control device as recited in any preceding feature, wherein the signed local-access token is not associated with a user account.

Feature 12. A cloud network comprising: at least one processor; and at least one non-transitory computer-readable medium comprising program instructions that are executable by the at least one processor such that the cloud network is configured to: receive, at the cloud network, a cloud authorization grant assertion from a guest control device, wherein the cloud authorization grant assertion comprises at least a portion of a signed local-access token, wherein: the signed local-access token is signed by the first playback device, and the at least the portion of the signed local-access token comprises an identifier for the first playback device; verify the signed local-access token is valid; and send, to the guest control device, a cloud guest token, wherein the cloud guest token is signed by the cloud network and allows the guest control device to access cloud-based services associated with the playback devices on the local area network.

Feature 13. The cloud network as recited in feature 12, wherein the cloud authorization grant assertion comprises a signature associated with the guest control device.

Feature 14. The cloud network as recited in feature 13, wherein the identifier for the first playback device is relied upon to indicate that the guest control device is physically present on the same local area network as the first playback device.

Feature 15. The cloud network as recited in one of features 12 to 14, wherein the signed local-access token comprises a first playback device identifier and a token expiration time.

Feature 16. The cloud network as recited in feature 15, wherein at least the token expiration time relies upon a network device relative time that is derived independent of an external time source, the network device relative time further comprising: a first unique relative time identifier, and a first relative time indicator that increments or decrements from a pre-determined event.

Feature 17. The cloud network as recited in feature 15 or 16, wherein the at least one non-transitory computer-readable medium further comprises program instructions that are executable by the at least one processor such that the cloud network is configured to: receive, at the cloud network, a cloud command that is configured to cause the cloud network to provide information to be displayed at the guest control device or at the first playback device, wherein the cloud command comprises the cloud guest token; identify, at the cloud network, the first playback device identifier within the cloud guest token; and after determining that the cloud guest token has not expired, communicate the information to the guest control device.

Feature 18. A computer-implemented method for authenticating a guest control device, the computer-implemented method comprising: communicating, through a local area network to a first playback device, a self-signed authorization assertion; receiving, from the first playback device, a signed local-access token, wherein the signed local-access token is signed by the first playback device and allows the guest control device to access services via playback devices on the local area network; communicating, to a cloud network, a cloud authorization grant assertion, wherein the cloud authorization grant assertion comprises: at least a portion of the signed local-access token, wherein the at least the portion of the signed local-access token comprises an identifier for the first playback device; and receiving, from the cloud network, a cloud guest token, wherein the cloud guest token is signed by the cloud network and allows the guest control device to access cloud-based services associated with the playback devices on the local area network.

V. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A guest control device comprising:
- at least one processor; and
- at least one non-transitory computer-readable medium comprising program instructions that are executable by the at least one processor such that the guest control device is configured to:
  - communicate, through a local area network to a media playback system comprising a first playback device, a self-signed authorization assertion;
  - receive, from the first playback device, a signed local-access token, wherein the signed local-access token is signed by the first playback device and allows the guest control device to access services via playback devices on the local area network;
  - communicate, to a cloud network, a cloud authorization grant assertion, wherein the cloud authorization grant assertion comprises:
    - at least a portion of the signed local-access token, wherein the at least the portion of the signed local-access token comprises an identifier for the first playback device; and
  - receive, from the cloud network, a cloud guest token, wherein the cloud guest token is signed by the cloud network and allows the guest control device to access cloud-based services associated with the playback devices on the local area network.

2. The guest control device as recited in claim 1, wherein the cloud authorization grant assertion comprises a signature associated with the guest control device.

3. The guest control device as recited in claim 2, wherein the identifier for the first playback device is relied upon to indicate that the guest control device is physically present on the same local area network as the first playback device.

4. The guest control device as recited in claim 1, wherein the signed local-access token comprises a first playback device identifier and a token expiration time.

5. The guest control device as recited in claim 4, wherein at least the token expiration time relies upon a network device relative time that is derived independent of an external time source, the network device relative time further comprising:
- a first unique relative time identifier, and
- a first relative time indicator that increments or decrements from a pre-determined event.

6. The guest control device as recited in claim 5, wherein the at least one non-transitory computer-readable medium further comprises program instructions that are executable by the at least one processor such that the guest control device is configured to:
- communicate to a second playback device, through the local area network, a local command that is configured to cause the second playback device to perform a function, wherein the local command comprises the signed local-access token;
- identify, at the second playback device, the first playback device identifier within the signed local-access token;
- communicate, from the second playback device to the first playback device, a request for a second unique relative time identifier and a second relative time indicator; and
- compare the first unique relative time identifier and the token expiration time within the signed local-access token with the second unique relative time identifier and the second relative time indicator.

7. The guest control device as recited in claim 6, wherein the at least one non-transitory computer-readable medium further comprises program instructions that are executable by the at least one processor such that the guest control device is configured to: when the first unique relative time identifier indicates that the token expiration time has lapsed, reject the local command.

8. The guest control device as recited in claim 6, wherein the at least one non-transitory computer-readable medium further comprises program instructions that are executable by the at least one processor such that the guest control device is configured to: when the first relative time indicator and the second relative time indicator fail to match, reject the local command.

9. The guest control device as recited in claim 4, wherein the at least one non-transitory computer-readable medium further comprises program instructions that are executable by the at least one processor such that the guest control device is configured to:
- communicate, to the cloud network, a cloud command that is configured to cause the cloud network to provide information to be displayed at the guest control device or at the first playback device, wherein the cloud command comprises the cloud guest token;
- identify, at the cloud network, the first playback device identifier within the cloud guest token; and
- after determining that the cloud guest token has not expired, display the information at the guest control device.

10. The guest control device as recited in claim 1, wherein the local area network comprises a personal area network.

11. The guest control device as recited in claim 1, wherein the signed local-access token is not associated with a user account.

12. A cloud network comprising:

at least one processor; and at least one non-transitory computer-readable medium comprising program instructions that are executable by the at least one processor such that the cloud network is configured to:

receive, at the cloud network, a cloud authorization grant assertion from a guest control device, wherein the cloud authorization grant assertion comprises at least a portion of a signed local-access token, wherein:

the signed local-access token was generated in response to a self-signed authorization assertion sent from the guest control device to a first playback device on a local area network shared by the guest control device, the signed local-access token is signed by the first playback device and allows the guest control device to access services via playback devices on the local area network, and the at least the portion of the signed local-access token comprises an identifier for the first playback device;

verify the signed local-access token is valid; and send, to the guest control device, a cloud guest token, wherein the cloud guest token is signed by the cloud network and allows the guest control device to access cloud-based services associated with the playback devices on the local area network.

13. The cloud network as recited in claim 12, wherein the cloud authorization grant assertion comprises a signature associated with the guest control device.

14. The cloud network as recited in claim 13, wherein the identifier for the first playback device is relied upon to indicate that the guest control device is physically present on the same local area network as the first playback device.

15. The cloud network as recited in claim 12, wherein the signed local-access token comprises a first playback device identifier and a token expiration time.

16. The cloud network as recited in claim 15, wherein at least the token expiration time relies upon a network device relative time that is derived independent of an external time source, the network device relative time further comprising:

a first unique relative time identifier, and a first relative time indicator that increments or decrements from a pre-determined event.

17. The cloud network as recited in claim 16, further comprising a second playback device, wherein the second playback device comprises another non-transitory computer-readable medium that comprises program instructions that are executable by another at least one processor such that the second playback device is configured to:

receive at the second playback device, from the guest control device, a local command that is configured to cause the second playback device to perform a function, wherein the local command comprises the signed local-access token;

identify, at the second playback device, the first playback device identifier within the signed local-access token;

communicate, from the second playback device to the first playback device, a request for a second unique relative time identifier and a second relative time indicator; and compare the first unique relative time identifier and the token expiration time within the signed local-access token with the second unique relative time identifier and the second relative time indicator.

18. The cloud network as recited in claim 17, when the first unique relative time identifier indicates that the token expiration time has lapsed, reject the local command.

19. The cloud network as recited in claim 15, wherein the at least one non-transitory computer-readable medium further comprises program instructions that are executable by the at least one processor such that the cloud network is configured to:

receive, at the cloud network, a cloud command that is configured to cause the cloud network to provide information to be displayed at the guest control device or at the first playback device, wherein the cloud command comprises the cloud guest token;

identify, at the cloud network, the first playback device identifier within the cloud guest token; and after determining that the cloud guest token has not expired, communicate the information to the guest control device.

20. A computer-implemented method for authenticating a guest control device, the computer-implemented method comprising:

communicating, through a local area network to a media playback system comprising a first playback device, a self-signed authorization assertion;

receiving, from the first playback device, a signed local-access token, wherein the signed local-access token is signed by the first playback device and allows the guest control device to access services via playback devices on the local area network;

communicating, to a cloud network, a cloud authorization grant assertion, wherein the cloud authorization grant assertion comprises:

at least a portion of the signed local-access token, wherein the at least the portion of the signed local-access token comprises an identifier for the first playback device; and receiving, from the cloud network, a cloud guest token, wherein the cloud guest token is signed by the cloud network and allows the guest control device to access cloud-based services associated with the playback devices on the local area network.

* * * * *